(12) United States Patent
Ubidia

(10) Patent No.: US 12,139,389 B2
(45) Date of Patent: *Nov. 12, 2024

(54) MOTOR AND PUMP SYSTEM

(71) Applicant: Micro Infinity Flow LLC, Ludlow, MA (US)

(72) Inventor: Fernando A. Ubidia, Ludlow, MA (US)

( * ) Notice: Subject to any disclaimer, the term of this patent is extended or adjusted under 35 U.S.C. 154(b) by 667 days.

This patent is subject to a terminal disclaimer.

(21) Appl. No.: 17/132,093

(22) Filed: Dec. 23, 2020

(65) Prior Publication Data

US 2021/0130150 A1     May 6, 2021

Related U.S. Application Data

(63) Continuation of application No. 15/370,745, filed on Dec. 6, 2016, now Pat. No. 10,913,648.
(Continued)

(51) Int. Cl.
| | | |
|---|---|---|
| B67D 1/12 | (2006.01) | |
| B67D 1/00 | (2006.01) | |
| B67D 1/08 | (2006.01) | |
| B67D 1/10 | (2006.01) | |
| F04B 17/03 | (2006.01) | |
| F04B 49/06 | (2006.01) | |
| F04B 49/22 | (2006.01) | |
| G05D 7/06 | (2006.01) | |

(52) U.S. Cl.
CPC ......... *B67D 1/1202* (2013.01); *B67D 1/0037* (2013.01); *B67D 1/0888* (2013.01); *B67D 1/0892* (2013.01); *B67D 1/10* (2013.01); *B67D 1/1231* (2013.01); *F04B 17/03* (2013.01); *F04B 49/065* (2013.01); *F04B 49/22* (2013.01); *G05D 7/0682* (2013.01); *B67D 2001/0827* (2013.01); *B67D 1/0855* (2013.01); *B67D 2210/00091* (2013.01); *B67D 2210/00099* (2013.01)

(58) Field of Classification Search
None
See application file for complete search history.

(56) References Cited

U.S. PATENT DOCUMENTS

| | | |
|---|---|---|
| 4,241,299 A | 12/1980 | Bertone |
| 4,741,675 A | 5/1988 | Bowden |

(Continued)

FOREIGN PATENT DOCUMENTS

| | | |
|---|---|---|
| AU | 734299 | 6/2001 |
| AU | 2018211303 | 7/2019 |
| EP | 2188203 | 7/2016 |

*Primary Examiner* — Mohammad Ali
*Assistant Examiner* — Saad M Kabir
(74) *Attorney, Agent, or Firm* — Aronberg Goldgehn Davis & Garmisa

(57) ABSTRACT

The present system generally relates to a fluid flow system where a controller and motor pump assemblies are used to optimize the control of fluid flow through the system. The controller samples the back electromotive force of the motor and pump assemblies and is able to utilize the sampled back electromotive force in conjunction with predefined target back electromotive force values, preferably empirically determined and tuned to an induvial motor and for a select fluid, to tune the voltage applied to the system, control the back electromotive force of the system and, by extension, control the flow of fluid.

12 Claims, 16 Drawing Sheets

Related U.S. Application Data

(60) Provisional application No. 62/274,652, filed on Jan. 4, 2016.

(56) References Cited

U.S. PATENT DOCUMENTS

| | | | |
|---|---|---|---|
| 4,821,925 | A | 4/1989 | Wiley et al. |
| 5,360,320 | A | 11/1994 | Jameson et al. |
| 5,415,532 | A | 5/1995 | Loughnane et al. |
| 6,296,456 | B1 | 10/2001 | Thornelow et al. |
| 6,325,244 | B2 | 12/2001 | Vincent et al. |
| 6,620,189 | B1 | 9/2003 | Machold et al. |
| 7,572,108 | B2 | 8/2009 | Koehl |
| 7,806,915 | B2 | 10/2010 | Scott et al. |
| 7,842,003 | B2 | 11/2010 | Jones et al. |
| 7,905,373 | B2 | 3/2011 | Beavis et al. |
| 8,087,303 | B2 | 1/2012 | Beavis |
| 8,091,736 | B2 | 1/2012 | Beavis et al. |
| 9,234,512 | B2 | 1/2016 | Ubidia |
| 10,173,881 | B2 | 1/2019 | Beavis et al. |
| 10,717,638 | B2 | 7/2020 | Beavis et al. |
| 2004/0055363 | A1 | 3/2004 | Bristol |
| 2005/0035152 | A1 | 2/2005 | Bethuy et al. |
| 2007/0206436 | A1 | 9/2007 | Niermeyer et al. |
| 2008/0131295 | A1 | 6/2008 | Koehl |
| 2013/0081718 | A1* | 4/2013 | Ubidia .................. F04C 15/008 137/565.01 |
| 2014/0093866 | A1 | 4/2014 | Tan et al. |
| 2014/0239863 | A1* | 8/2014 | Melanson ............... H02P 21/24 318/400.34 |
| 2014/0305315 | A1 | 10/2014 | Perentes et al. |
| 2015/0082243 | A1 | 3/2015 | Taylor et al. |
| 2016/0184496 | A1 | 6/2016 | Jaecklein et al. |
| 2018/0164837 | A1 | 2/2018 | Beavis et al. |

* cited by examiner

MOTOR AND PUMP SYSTEM

CROSS-REFERENCE TO RELATED APPLICATION

This application claims priority to U.S. patent application Ser. No. 15/370,745, filed Oct. 6, 2016 which claims priority to U.S. Provisional Application Ser. No. 62/274,652, filed Jan. 4, 2016, the entirety of each of which are incorporated herein by this reference.

BACKGROUND

The technology described herein generally relates to a motors and pump system, as well as the control of systems employing them, such as fluid dispensing systems. One type of fluid dispensing system includes, but is not limited to, a beverage dispensing system. Such systems use a number of electrical and mechanical components to dispense fluids. For beverages such as soda, the system pumps both a base liquid (such as carbonated water) and one or more products (such as flavored soda syrups) and combines them to create the desired soda. The process requires that the carbonated water and syrup each be pumped at precise flowrates in order to properly mix the ingredients and create the desired flavor profile for the soda.

One standard beverage dispensing unit uses a fluid pump (a "bag-in-box" or "BIB" pump) during operation. The BIB pumps used on standard beverage dispensers are either gas driven, such as by $CO_2$, or electrically powered, but they lack accurate flow control. BIB pumps operate such that they are either under full power or are off. They do not modulate their flowrates.

The dispensing systems use the BIB pump to flow fluid, such as a product, from a storage container, such as a bag-in-box or other package, through a tube and dispensing valve and out through a dispensing nozzle. Current beverage dispensing units rely on mechanical flow control devices external to the pumps to control or regulate flow. The dispensing valve may include flow control devices for each product and a solenoid valve. Flow control devices are complex and expensive. They require a number of components, such as, pistons, sleeves, springs, and adjustment screws to operate.

Gas driven or electrically powered BIB pumps operate under constant pressure and require pressure switches to operate. Changes of pressure within the system activate the pumps, but the flowrate is not metered by the pumps.

Standard beverage dispensing systems use dispensing apparatuses typically comprised of an electromechanical solenoid valve and a mechanical flow control device comprised of a piston, cylinder, spring and adjustment screw. Each product dispensed from the apparatus has one of these mechanical flow controls. The combination of these components and the apparatus is commonly referred to as the dispensing valve.

While the operating principle of the mechanical flow control device used in standard dispensing valves is relatively simple, the implementation and design of the flow control is rather complex. Furthermore, the components are expensive to manufacture, bulky in size, and each mechanical flow control configuration is designed for a limited, specific flowrate. If a different flowrate range is desired, such as with a different product concentration, a new mechanical flow control must be designed and manufactured.

The standard dispensing valve may provide acceptably precise product flow after a technician performs an initial setup calibration. However, the mechanical flow control cannot compensate for changes in the dispensing system which may affect flow. As product is depleted from the BIB, the flow precision of the standard dispensing valve will decrease, or the nominal flow rate will drift. The technician typically returns to recalibrate the dispensing valve once or twice a year, but during the intervening period the flow precision and beverage quality will decrease.

In addition to the standard dispensing valve, gas driven BIB pumps have a gas coupling regulated with a mechanical pressure regulator set to a specific gas pressure, typically 50-60 psig, and they include a pressure switch. Electrically powered BIB pumps are driven at their rated voltage, typically 12 VDC or 120 VAC, and they also include a pressure switch. Both are demand based pumps that operate based on pressure differential. That is, once a sufficient pressure differential develops downstream due to the standard dispensing valve's solenoid valve opening, the pump will begin flowing product. The pump will continue flowing product while the pressure differential is sustained. When the dispensing solenoid valve closes, the pressure in the tubing between the pump and the dispensing valve increases until the preset pressure of the pump is reached, at which point the pump ceases flowing product.

Another feature of the operation of the gas driven pumps, such as BIB pumps, is such that the resulting product flow has a pronounced, periodic pulsing characteristic. Initially, the pump flows product at the full set pressure of the pump. However, the pressure and flow quickly drop to a low level for a brief time before rapidly rising back to the original pressure and flow. Generally, the rate of pulsation is approximately one pulse per second. This mechanically pulsed flow necessitates the use of mechanical flow controls to maintain acceptably accurate flow. Accurate flow, though, is only achieved on the average over a period of time. High precision flow is not achievable due to the fluctuating nature of the pulsed flow.

Several variables have an effect on the flow rate of the product. One is the vacuum required to evacuate product from the BIB as the bag collapses. The BIB bag is sealed, so as more product is depleted from the bag, additional vacuum is required by the pump to flow product at the same flowrate.

Another variable is the vertical head height of the product with respect to the dispensing location. BIB racks typically have different BIB set at different vertical heights, for example the top BIB can be 5 to 6 feet above the lowest BIB in the rack. The difference in head height of the product with respect to the dispense point affects the pressure of the product in the line and the amount of vacuum required to flow the product at a specific flow rate. Yet another set of variables are line length, line diameter, and product density, which all affect pressure drop and flowrate.

Standard BIB pumps have no feedback for flow control. They run open loop and have no means to automatically adjust flow their flow rate as any of the aforementioned variables affecting flow change. Standard BIB pumps are specifically designed to operate within a limited flow range, but they are not designed for precision flow. The flow control device within the standard dispensing valve is relied upon to provide flow control of the product, while the standard BIB pump is designed to provide bulk flow. The standard BIB pump and the standard dispensing valve flow control do not perform well when running outside of the limited, design flow range.

Standard BIB pump systems do not include a device to specifically detect a sold out condition. Typically, the only evidence that a sold out condition has occurred is when a person operating the dispensing unit views a disruption in the flow of product from the dispensing unit, or through the lower quality taste of the beverage dispensed. There are optional, automatic changeover valves available which switch the connection of the product source from a depleted BIB to a full BIB. These changeover valves operate using a vacuum switch, typically detecting between 10-20 in. Hg. However, these devices are not sensitive to small pressure changes. By the time the changeover valve switches the BIB connection, a substantial amount of product has been evacuated from the line, being replaced with air. The evacuation of product and introduction of air leads to several shortcomings. Firstly, as air is introduced into the line, the actual amount of product dispensed deviates from the target volume. For typical sized beverages, 10 or more product dispenses may deviate from the specified volume by an order of 20-25% of the target volume before the changeover valve switches the BIB. This level of deviation will affect the quality of the dispensed beverage (the acceptable level of deviation is 5% of the target volume).

After the changeover valve switches the BIB, a substantial amount of product is wasted before the air is evacuated from the lines and product refills the lines. Typically 250-500 mL of product (roughly 20-40 dispenses) must be pumped through the lines before the air is evacuated from the lines and the dispense volume stabilizes.

Additionally, because standard BIB pumps are demand based and are under ever present pressure, there is a risk of catastrophic leaks. The pressure is continuously exerting force on the lines, couplings, and connections. If a leak develops within the high pressure side of a standard BIB pump, the pump will continue to run until all product is depleted, leading to product waste and potential property damage.

Standard BIB pumps do not provide precise flowrates, and additional flow control devices are required to control preset flowrates. Standard flow devices are expensive, complex and difficult to adjust. Because they lack accurate flow control feedback, and because changes in flow are not self-regulated or adjusted over time, they repeatedly need to be manually recalibrated and adjusted to properly dispense the desired flow rates. Adjustment and calibration of standard flow control devices require trained personnel. Repeated and expensive calibration is required on a regular basis to correct the drift from the preset flow rates that standard flow control devices experience. Thus there is a need to develop a system that accurately controls the dispensing of fluid without the need for standard flow control devices or repeated recalibration.

The present system provides precise closed-loop flow control. For dispensing fluids, including beverages, the present system provides several benefits over standard beverage dispensing systems. In addition to the precise flow control achieved, the control system, motor, and pump replace the standard dispensing valve equipment for products and provide a system having fewer mechanical components and at a lower component cost. While the present system may be utilized in a beverage dispensing system, such as a BIB system, it should be understood that the present system is not limited to such applications. Rather, one of ordinary skill in the art will understand that the present system may be adapted to various applications where control of fluid flow is required.

SUMMARY

The present system provides closed loop flow control to provide self adjusting, precise flow. It also simplifies the construction of the overall fluid dispensing system by eliminating several of the components previously needed to control flow. In the present system, a fluid component (i.e. a product) is pumped from a product storage container using a fluid pump that utilizes an electric motor and Back Electro-Motive Force ("BEMF") measuring control system.

The BEMF provides an indication of the operation of the motor. By extension, the BEMF can be interpreted as providing an indication of the flowrate of fluid through the pump that is operated by the motor. Monitoring the BEMF and controlling the actual operation of the motor can therefore be used to indirectly monitor and control the fluid flow through the pump.

The control system is used to measure BEMF and modulate the pulse width of the voltage applied to the motor (hereinafter referred to as the "PWM voltage" or simply "PWM") to maintain consistent pump flow. No additional flow control components, such as the external flow control devices, are required. Thus, the need for flow control devices and solenoid control valves is eliminated.

Additional parameters can also be accounted for. For example, as the product in the BIB is depleted, the pump must work harder to pump the same amount of product. The relationship between the depletion and the operation of the pump is known. The BEMF of the pump will change due to the depletion of the fluid, but that change may be corrected and accounted for in order to maintain constant and accurate fluid flow despite varying operating conditions.

DETAILED DESCRIPTION OF PREFERRED EMBODIMENTS

Figure 1:
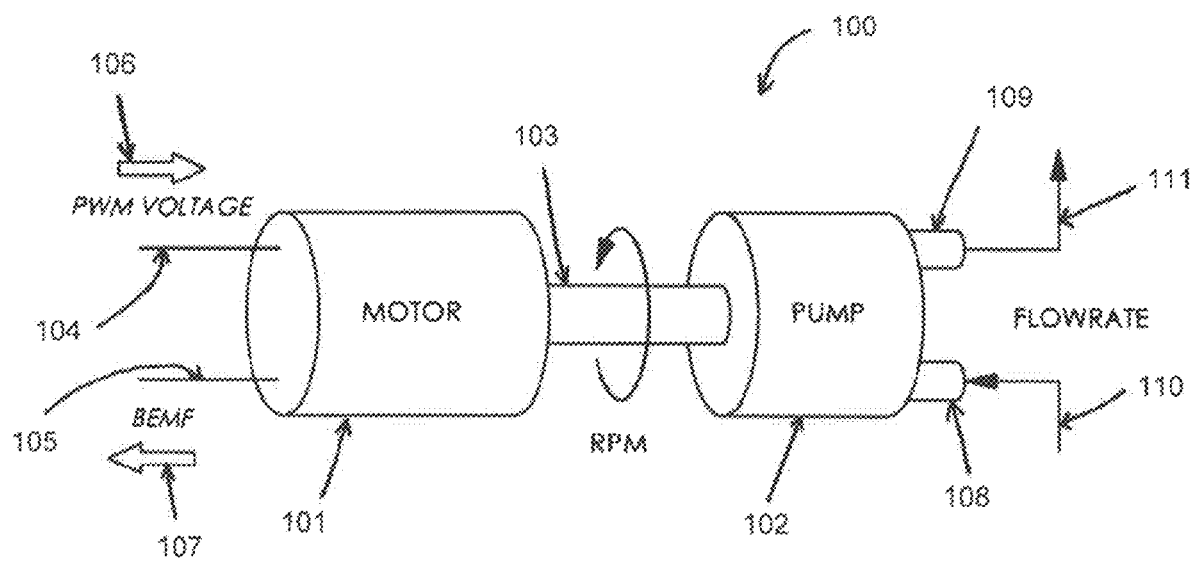
FIG. 1 is a generic depiction of a motor rotationally coupled to pump by a shaft.

Throughout the specification, wherever practicable, like structures will be identified by like reference numbers. In some figures, components, such as additional electrical connections and tubing have been removed for clarity in the drawings. In some cases exemplary components are provided for explanatory purposes and it should be understood that other similar devices to those depicted in the drawings may be provided with similar components. Unless expressly stated otherwise, the term "or" means "either or both" such that "A or B" includes A alone, B alone, and both A and B together.

FIG. 1 is a generic depiction of a motor and pump assembly 100. It includes a motor 101 connected to a pump 102 by a shaft 103. The motor includes electrical connections 104 and 105. A PWM voltage 106 is applied to the motor across connections 104 and 105 causing the motor 101 to rotate shaft 103. The application of PWM 106 also causes the motor to generate BEMF 107. As the motor 101 rotates shaft 103, it activates pump 102. Pump 102 includes a fluid inlet 108 and a fluid outlet 109. Activation of pump 102 causes the inflow of fluid 110 into the pump as well as the outflow of fluid 111 out of the pump.

In the preferred embodiment, the fluid pump 102 is a positive displacement type pump, and its RPM is proportional to the fluid flowrate of the pump. For example, the motor 101 and the pump 102 are coupled together such that the rotation of the motor's shaft rotates the shaft of the pump thereby creating negative pressure at the pump inlet 108 and positive pressure at the pump outlet 109 in order to force fluid through the pump. In the embodiment shown in FIG. 1, the motor 101 is rotationally coupled to the fluid pump 102 directly through a shaft 103, and therefore the respective rotations of the motor and the pump are directly proportional. In another embodiment gearing or a transmission (not shown) separates the motor and the pump such that the shafts of the motor and the pump rotate at different RPMs, though still remain proportional to one another. In either case, the flowrate of fluid through the pump is determined by measuring motor BEMF voltage. Thus the motor and pump, in addition to inducing fluid flow through the system, effectively function as a flow meter. Specific examples of pumps that could be used are the pumps described in U.S. patent application Ser. No. 13/589,932 and U.S. Provisional Application 61/542,628. The entire disclosures of both U.S. patent application Ser. No. 13/589,932 and U.S. Provisional Application 61/542,628 are hereby incorporated in their entirety herein by this reference.

Figure 2:
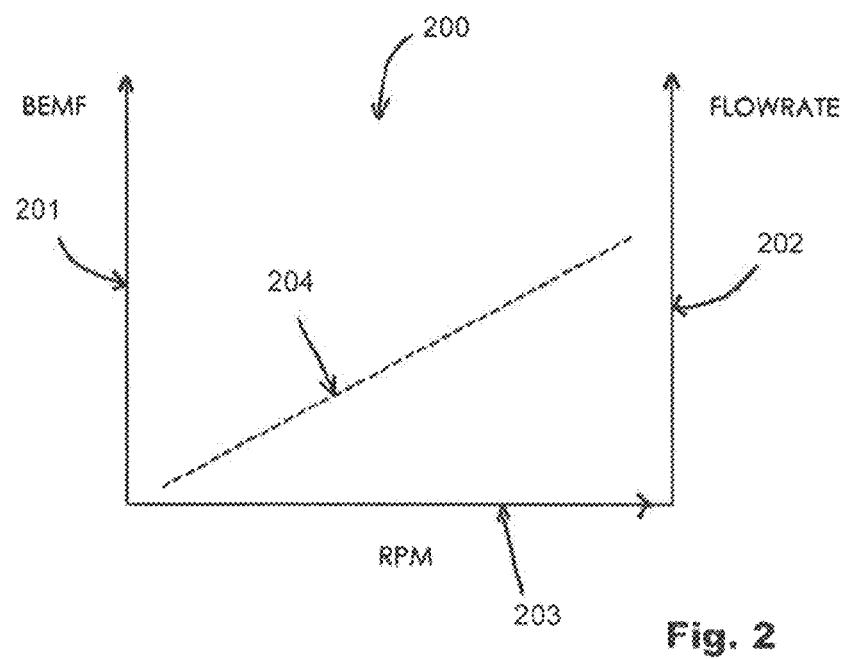
FIG. 2 is a depiction of graph illustrating BEMF relationship to RPM and flow rate relationship to RPM.

FIG. 2 is a graph 200 showing the relationship of the BEMF, the RMP of the motor, and the flowrate of the pump. The BEMF scale 201 is proportional to the flowrate scale 202. As the RPMs of the motor increase along the RMP scale 203, the BEMF and flowrate each increase as shown by the relationship curve 204 which is linear. That relationship can be exploited to use changes in the BEMF to alter the RPM of the motor and thereby adjust the flowrate.

Figure 3:
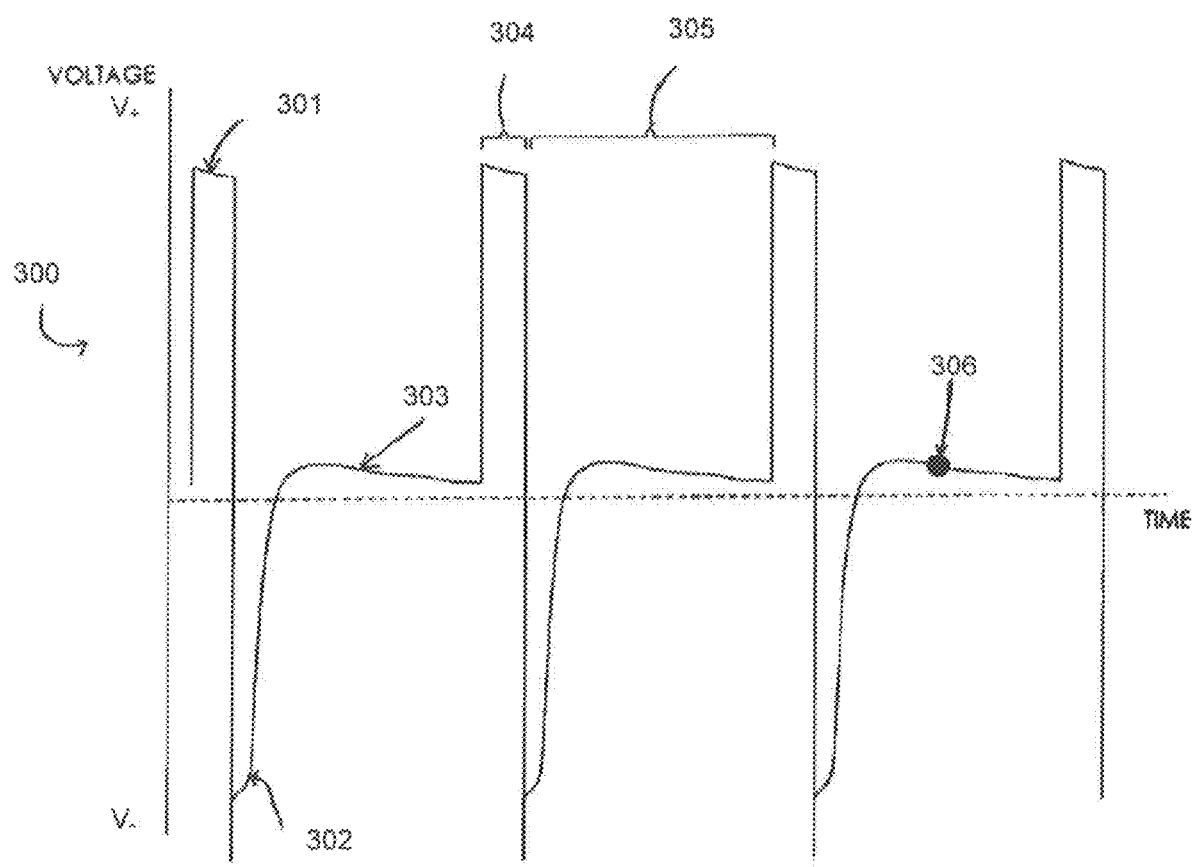
FIG. 3 is a depiction of an exemplary measurement (e.g. oscilloscope graph) of PWM signal and BEMF signal.

BEMF is the voltage generated by the motor as the motor windings rotate relative to a magnetic field. The control system applies PWM to the motor to power the motor. FIG. 3 is a graph 300 depicting the PWM and BEMF signals as measured by an oscilloscope monitoring the electrical operation of the motor. The graph depicts three PWM periods. The voltage signal of the system actually shows three elements: the PWM voltage 301, the negative voltage spike 302 caused by the motor's inductance, and the BEMF 303 generated by the motor. During each PWM period, there is an ON segment 304 during which the voltage signal 301 is applied (i.e. the power supply voltage), and the OFF segment 305 during which the voltage signal is off (i.e. ground). BEMF is generated by the motor anytime there is relative motion between the windings and magnetic field. However, the ON segment of the PWM signal and negative voltage spike mask the BEMF signal. It is after these two events pass that the BEMF signal 303 is visible. It is during the OFF time 305 of the PWM period that BEMF signal 303 is optimally measured by the control system. Preferably, the measurement of the BEMF signal (shown as 306 for exemplary purposes) for use in controlling the flowrate of the pump is taken at approximately the midpoint of the OFF time. That allows the system to ignore the negative voltage spike 302 that occurs immediately after the PWM switches from ON to OFF.

The ratio of the ON time 304 to the OFF time 305 is referred to as the PWM duty cycle and may be expressed as a percentage (PWM duty cycle percentage). The PWM average voltage is the power source voltage multiplied by the PWM duty cycle percentage. By varying the PWM duty cycle, the PWM average voltage may be adjusted to change the voltage powering the motor without actually changing the base power source voltage.

As shown in FIG. 2, the motor generated BEMF voltage is directly proportional to the rotational speed (RPM) of the motor. Thus, values of BEMF voltage may be correlated to specific speeds of the motor. Those BEMF voltage values may be stored in the memory of a computer control system. It should be understood by those of ordinary skill that storing the BEMF voltage values, or other values, in the memory may simply be storing a representation of the BEMF values, or other values, in a computer readable form (such as a binary representation of the value "5 volts"). During operation of the overall pump system, the control system measures the BEMF voltage, compares it to a stored target value BEMF voltage, and the control system either increases or decreases the PWM average voltage (preferably by adjusting the PWM duty cycle) as needed in order to match the BEMF voltage generated by the motor to the target value BEMF voltage. For example, as the motor RPM and pump flow rate begins to fall, as indicated by a decrease in the measured BEMF signal, the control system increases the PWM voltage to raise the motor BEMF voltage back to the target value BEMF voltage. That increases the flowrate back to the desired value. Conversely, as the motor RPM and pump flowrate increase, the control system decreases the PWM voltage to lower the motor BEMF voltage back to the target value BEMF voltage. That will decrease the flowrate back to the target value BEMF voltage.

Figure 4:
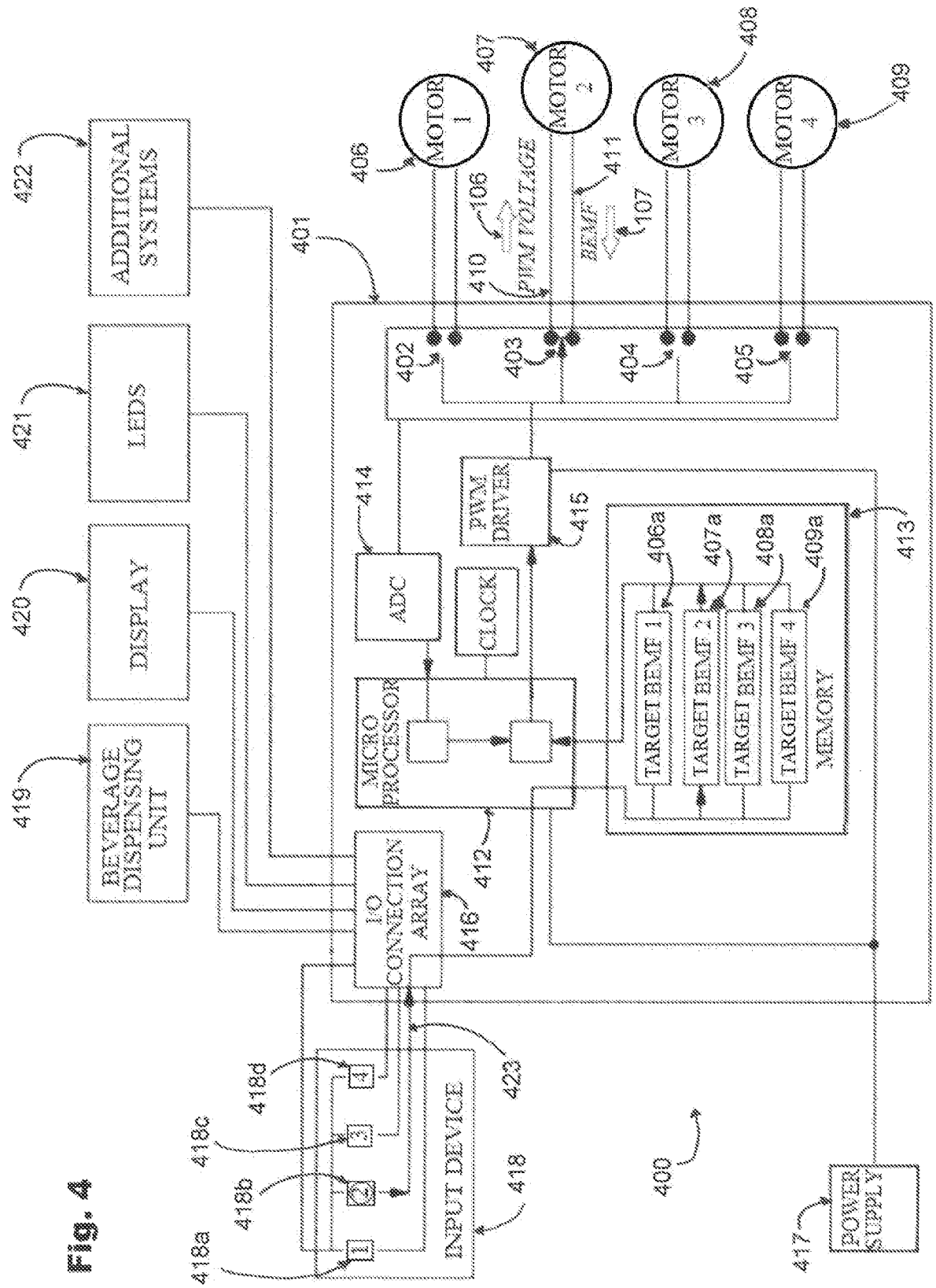
FIG. 4 is a depiction of block diagram of a control system.

FIG. 4 is an example of one embodiment of a system that may be a beverage dispensing system 400 that utilizes the described BEMF control for controlling the operation of the motor and pump system, and thus the flowrate. The system includes a controller 401. In the example shown in FIG. 4, the controller 401 is a printed circuit board that includes motor connections 402, 403, 404, 405 that connect to motors 406, 407, 408, 409 respectively. It should be appreciated that the components of the controller could be discrete and separate or integrated. The motors are connected by electrical conductors, such as wires. For example, wire 410 connects a positive terminal of the controller to the motor 407 and wire 411 connects a negative terminal of the controller to the motor 407. The wires carry the PWM voltage 106 and the BEMF 107 between the controller and the motor. In the embodiment shown, the controller 401 also includes a microprocessor 412, memory 413, an analog to digital converter 414 and PWM driver 415 along with an I/O connection array 416.

The microprocessor uses information regarding the PWM voltage and the BEMF for each motor to control each motor. In the embodiment shown, the BEMF voltage is fed to the analog to digital converter 414 that acts as a sensor and converts the analog motor BEMF into a digital signal that is used by the microprocessor 412 in the control of the motor. Additional sensors could also be used to sense the PWM voltage being applied to each respective motor and to sense and measure the BEMF of each respective motor and then transmit that information to the microprocessor. A power supply 417 provides power to the system and can be used to power the controller as well as to provide power to the PWM driver 415. Preferably, memory 413 is a programmable memory that stores target BEMF values 406a, 407a, 408a, 409a (which correspond to target values for motors 406, 407, 408, 409 respectively) and other variables such as sold-out threshold values (not shown). The PWM driver 415 may produce the PWM voltage signals to power the motors. The I/O connections may include of a combination of digital and analog outputs, digital and analog inputs, and communication interfaces such as RS-232 or RS-485 connections.

External systems may be connected to the controller through the I/O connection array, systems such as an input device 418 (which may have one or more inputs, such as buttons 418a, 418b, 418c, 418d), beverage dispensing unit 419, display 420, LEDs 421, and additional systems 422 all of which may be separate from one another as depicted in FIG. 4, included together within a single housing, integrated together, or a combination thereof.

The controller may control one or more motor connections such that a single motor or several motors may be operated by a single control system. The controller may power several motors individually, or several motors simultaneously so that, as particular needs arise, the control system may cause individual pumps to flow products one at a time or may cause several pumps to flow several products at the same time. The controller may include several network address variables assignable in its memory, and its I/O connections may be compatible with network communication protocols such as RS-485 and Ethernet so that several controllers may be networked together and execute commands independently or in tandem from a single input source such a keypad or beverage dispensing unit. Similarly, several control systems may transmit information to a single device, such as a beverage dispensing unit. Additionally, the control system memory may have an assignable master/slave variable defining its network hierarchy so that several slave control systems may be operated by a single master control system. An example network application of the control system is a beverage dispensing unit with a master assigned control system issuing dispense commands to several slave control systems at different BIB racks and receiving information from each control system such as when a product is sold out.

Figure 5:
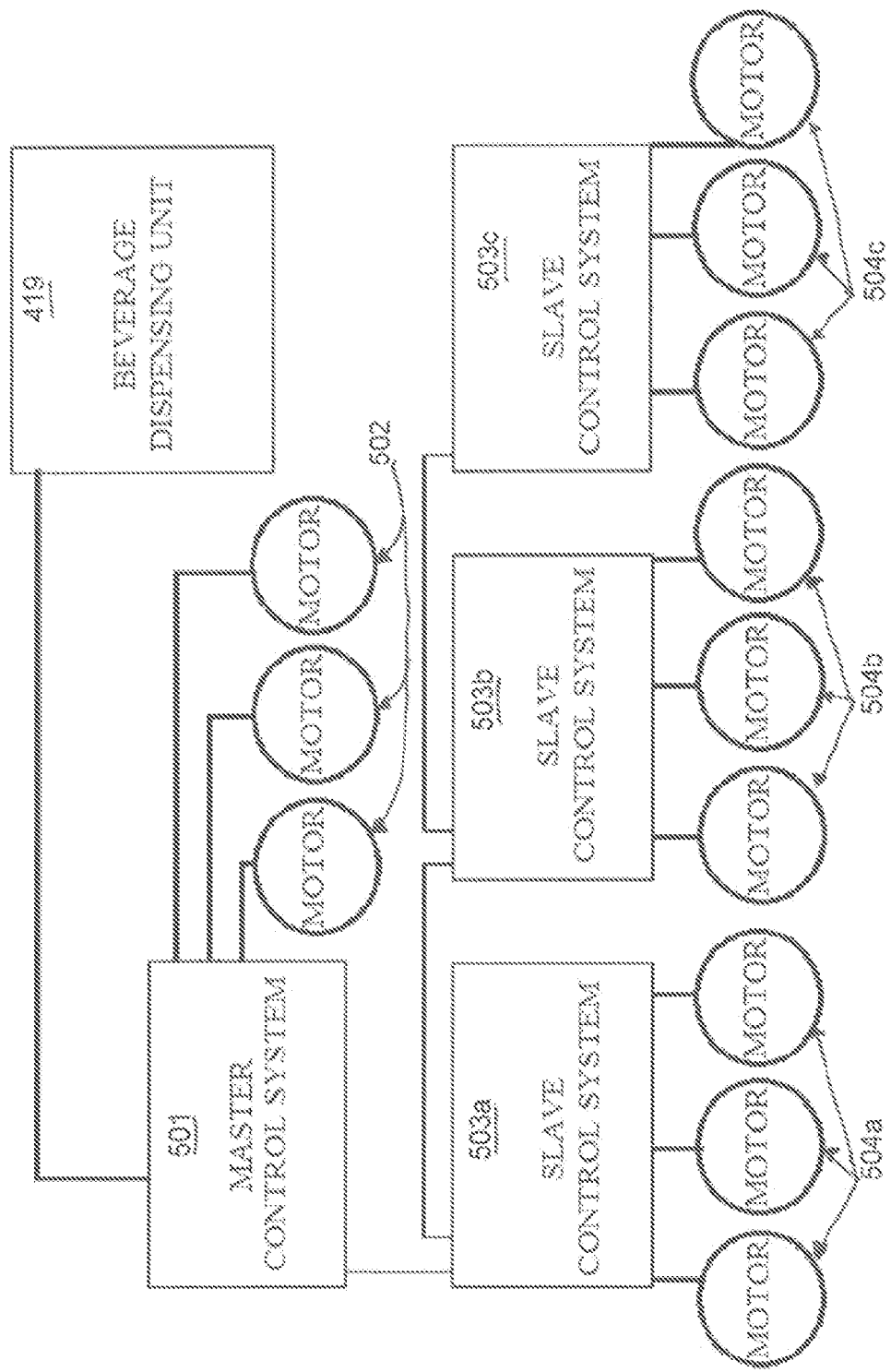
FIG. 5 is a depiction of block diagram of a network connection of several control systems and a beverage dispensing unit.

FIG. 5 is a depiction of an embodiment where multiple control systems may be networked together. That embodiment includes four control systems, each of which include a controller like that of controller 401 depicted in FIG. 4. A master controller 501 is connected to beverage dispensing unit 419 as well as a plurality of motors 502. Slave control systems 503a, 503b, and 503c are each connected to a plurality of motors 504a, 504b, and 504c, respectively. The slave control systems are connected to each other and to the master control system to form a network.

Figure 6:
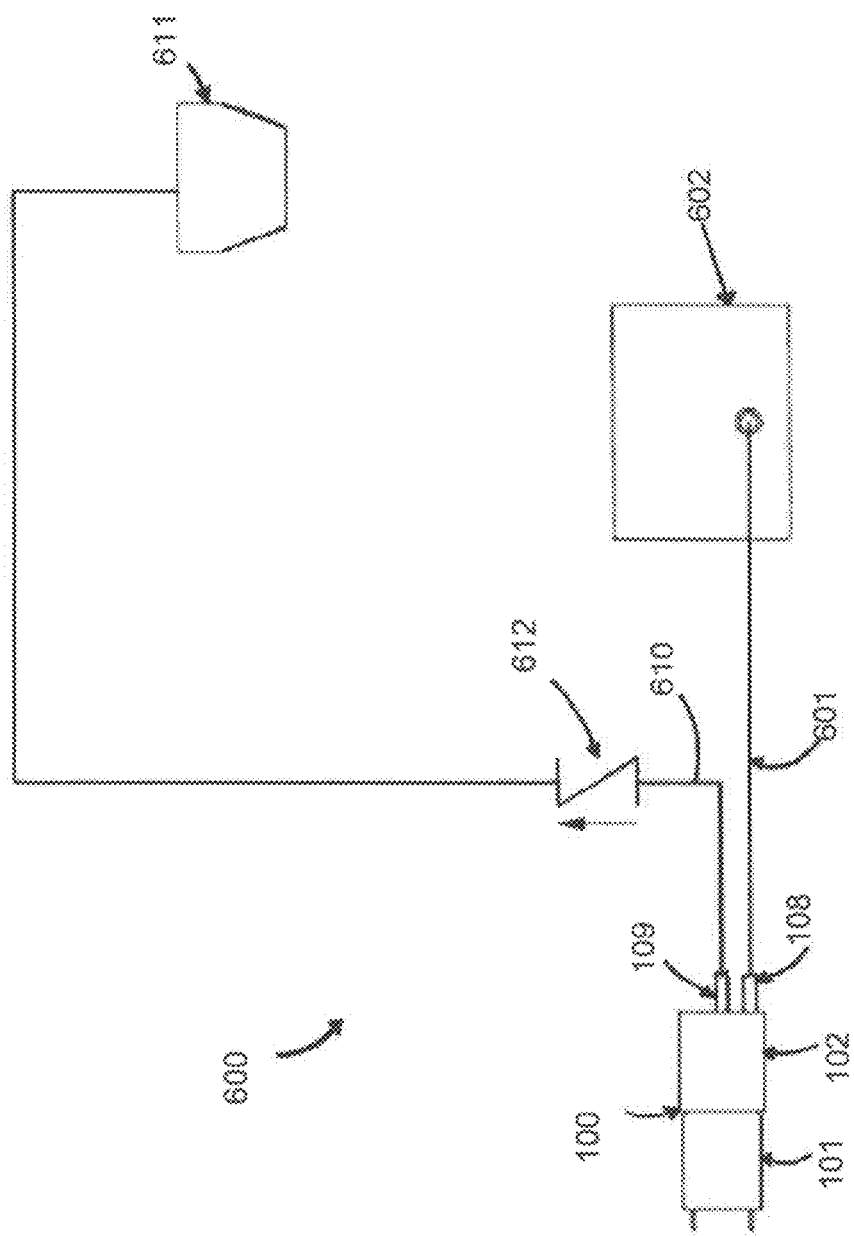
FIG. 6 is a depiction of block diagram of a simplified control system operation in conjunction with a beverage dispensing unit and associated pump.

FIG. 6 is a simplified schematic depiction of the pumping arrangement for a fluid dispensing system 600. In the example shown, the system includes the motor and pump assembly 100 which is made up of the motor 101 and pump 102. The pump 102 includes an inlet 108 on the suction side which is coupled through a line 601 (such as a tube or hose) to a fluid source 602 (which may contain, for example, a product such as soda syrup). The pump 102 also includes an outlet 109 on the discharge side which is coupled through a line 610 to a dispensing point 611 such as a nozzle on a beverage dispensing unit.

Preferably a backflow prevention device 612, such as a check valve, is placed on the discharge side of the pump. As the pump draws product from the product source 602, vacuum is generated within the suction line 601. When the pump is not actively flowing product, the vacuum persists and may cause product to flow in reverse, from the dispensing point 611 through the pump 102, and back into the product source container. Backflow prevention device 612 resists the vacuum in the suction line 601 and does not allow product to flow in reverse. The backflow prevention device creates a restriction in the system due to the dynamic flow losses through the backflow prevention device or because of the pressure required to open the backflow prevention device to allow fluid to flow through the device—known as cracking pressure—or both. The restriction may also smooth out the small flow oscillations created by the reciprocal action of the pump 102, resulting in increased accuracy in the control of the BEMF generated by the motor 101 and an increased consistency of flowrate.

The control system is programmed so that each particular product dispensed by the beverage dispensing unit has a target BEMF voltage value. The target BEMF voltage value is programmed and stored in the control system's memory. The target BEMF voltage is based on the correlated flowrate for the particular BEMF value for each particular product, and a different target BEMF may be programmed for each product. The differences in flowrates and target BEMF are generally due to the nature of the product and required output of the dispensing system in order to provide a properly mixed beverage. For example, cola beverage syrup may have a lower viscosity than orange beverage syrup which in turn may require a higher ratio of syrup to carbonated water to create a proper drink. Those variables dictate the desired flowrate for the differing products which translate into differing target BEMFs for the differing products.

Figure 8:
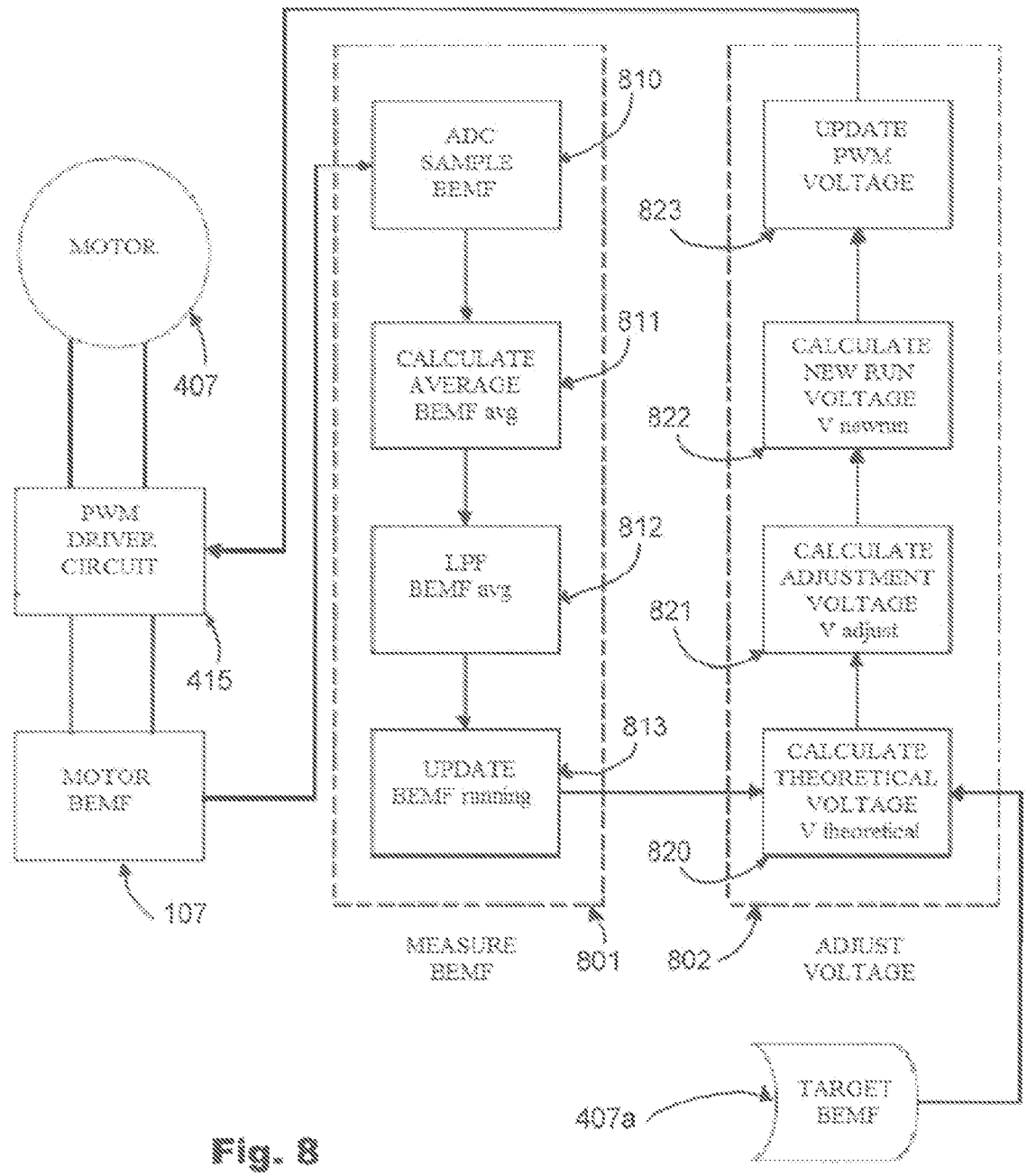
FIG. 8 is a flowchart depiction of an example measurement and calculation process performed by control system.

With reference to FIG. 4 and FIG. 8, an embodiment of the measurement and calculation process used by the control system may be described. FIG. 8 is a simplification of FIG. 4 showing only select components for explanatory purposes including a flowchart depicting the operation of an embodiment of the control system. In general, when the control system receives an instruction to dispense a product, the control system provides power to the respective motor, takes BEMF measurements, compares the BEMF measurements to the programmed target BEMF for the product, and adjusts the PWM voltage as needed to match the BEMF generated by the motor to the target BEMF. For explanatory purposes, the overall process can be considered a combination of the BEMF measurement process 801 and the Adjust Voltage process 802.

An example of the process is as follows:
1) a selection of input 418b is made resulting in a selection signal 423 being sent to the controller 401 through the I/O connection array 416 which relays the selection signal to the microprocessor 412;
2) The microprocessor 412 instructs the PWM driver 415 to supply an initial PWM voltage to the motor 407 (for example a 5 volt pulse is provided at a PWM period of 10 milliseconds (100 Hz PWM frequency), an example of which is shown in FIG. 3.

BEMF Measurement
3) During the OFF period 305, the ADC 414 samples the BEMF 107 at step 810. An example sampling scheme is the control system taking 5 samples at 2 microseconds apart (8 microsecond sampling period). Preferably, the sampling starts at the center of the PWM OFF segment (See, FIG. 3, sample 306). More or less samples could be taken.
4) The instantaneous BEMF samples are averaged at 811 to create a representative BEMF for the period [bemf_period]. Averaging the sample values result in a more accurate measurement of the BEMF voltage.
5) The BEMF average is processed by low pass filtering (LPF) at step 812 to separate and discard electrical noise from the BEMF average signal and to produce [bemf_running].
6) The control system updates the running parameters of the system with the new [bemf_running] at step 813.

Voltage Adjustment: The PWM voltage supplied to the motor is updated, for example, every 1.5 seconds after it has started running. The system modifies the PWM voltage by continuing the process.
7) A theoretical voltage is calculated [V_theoretical] by dividing the programmed target BEMF 407a[bemf_target] by [bemf_running] and multiplying it by the present motor voltage [V_run] at step 820. It should be understood that the "present" voltage is the voltage that is applied to the motor when the BEMF measurement is made.
8) An adjustment voltage is calculated [V_adjust] by taking the difference between [V_theoretical] and [V_run] at step 821.
9) A new motor voltage is calculated [V_newrun] by adding an adjustment percentage of [V_adjust] to [V_run] at step 822. The adjustment percentage is tuned to provide enough of a response in flowrate without overshooting the target BEMF or causing the system to enter a state of oscillation. Through empirical testing, 33% was determined to be an optimal adjustment percentage. However, alternate adjustment percentages could be used. Typically, a lower value would result in a slower response and take longer to correct the flowrate, while a higher value would risk overshooting the target and possibly result in the system oscillating. The value could be 25%, for example, but 33% produced a responsive enough change without causing the system to overshoot the target. That percentage also reduced the possibility of picking up noise when taking the measurements and thereby introducing noise—or its influence—into the system. Specific configurations of components and processing power of the controller may result in a different optimal adjustment percentage.
10) The PWM driver is updated to use the new voltage [V_newrun] at step 823 thereby causing an adjustment to the motor voltage. The updating process occurs by converting the [V_newrun] into a value corresponding to the appropriate duty cycle to achieve an average PWM voltage that is equal to V_newrun. As discussed previously, adjusting the duty cycle adjusts the average voltage while allowing the base input voltage to remain constant. In the preferred embodiment, to update the PWM voltage all that is required is an adjustment to the duty cycle.

The process (3-10) loops while the motor is running.

It is preferable for the power supply to provide a large enough base voltage to the control system so that the PWM OFF segment duration is long enough to measure an accurate BEMF signal. In one embodiment, it was determined that an optimal range for a source voltage is one that provides a PWM duty cycle that is in the 20%-40% duty cycle range. The particular source voltage value is specific to each application and its respective motors' electrical characteristics.

The system can be utilized to pump a different product with each motor and pump assembly. For example, different beverage products may have different viscosities, and the amount of product required per ounce of carbonated water (and hence the necessary flowrate for the product) may differ as well. The correlated values of flowrate and target BEMF for different products are determined empirically by using the control system to dispense each product and measuring its BEMF and flowrate relation. Due to the precise flowrate control of the control system, the nominal target BEMF values of the products are determined using the control system itself. The BEMF measurements are provided from the control system measurements, and true volumetric measurements of the products are validated using a volumetric or weight measurement such as a graduated cylinder or scale respectively. This measurement is repeated several times until an appropriate degree of statistical significance to the flowrate and BEMF relation is established.

Variations in temperature and viscosity in fluid can alter the operating characteristics of the system. Those variables can be tested and empirical data for how different fluids operate in the system can be ascertained though the tests. One or more additional control parameters accounting for the variations of individual fluids can then be determined from that data and those control parameters may further be used to assist in determining how to control the operation of the motor. For example, the new control parameters may be used to alter the percentage of the duty cycle used to adjust the PWM and so that the control system can more accurately and quickly bring the actual BEMF in line with the target BEMF in order to maintain a constant desired flowrate.

An Example of BEMF Control System in a Beverage System

Figure 9A:
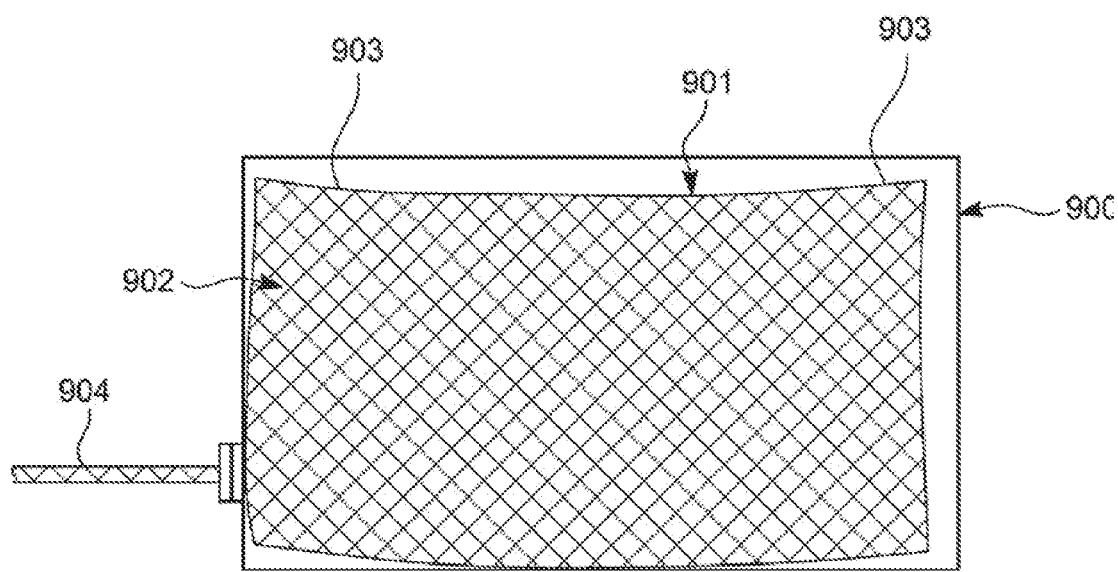
FIG. 9A is a depiction of a BIB product container showing a full bag.
Figure 9B:
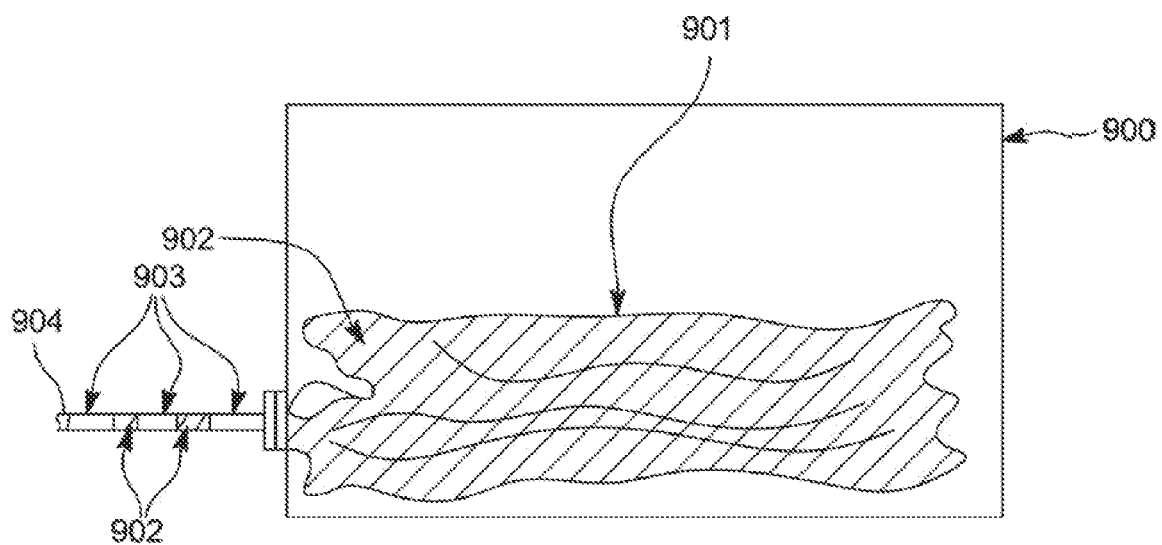
FIG. 9B is a depiction of a BIB product container showing depleted bag.

As shown in FIGS. 9A and 9B, beverage agents, like syrup, may be supplied in a BIB container. FIG. 9A shows a BIB box 900 having a BIB bag 901 filled with a beverage product 902. The BIB bag also contains air pockets 903. A tube 904 connects the BIB bag 901 to a dispensing system (not shown) and allows product to flow out of the BIB bag. As product flows out, the BIB bag collapses and eventually the product will become depleted to the point where insufficient fluid flows. Additionally, a fluid line may become blocked or another anomaly may occur resulting in insufficient fluid flow. FIG. 9B shows the BIB box 900 with the collapsed BIB bag 901 and depleted product 902. The tube 904 contains some amounts of product 902, but also air bubbles 903 due to the depletion of product from the BIB bag. The present system can reliably provide adequate fluid flow to that point and during the evacuation process detect anomalies and indicate that the product is sold out or flow has stopped.

For example, a BEMF of 800 mV−/+5% may be expected for normal operation. However, even using the BEMF to control the motor as described herein, operating conditions of the system my drastically change (i.e. an anomaly may occur) such that adequate control cannot be maintained to bring the motor operation back into line. If an anomaly occurs, such as a blocked line that cuts off fluid flow or if the fluid in the BIB is depleted, an abnormal change in the BEMF will be measured by the control system. For example, as discussed with respect to FIGS. 9A and 9B, standard BIB product containers include a small amount of air 903 within the bag 901. When product is depleted, this air will enter the product line, and there will be a sudden drop in vacuum required for the pump to flow product through the line. The drop in required vacuum will cause the pump and motor to speed up, and an abrupt change in BEMF will be measured by the control system. This change, for example a 20% increase in BEMF, is stored in the controller as a sold out threshold value and used by the control system to generate an output to indicate a sold out condition (such as an instruction to light an LED or display a message on a display). The sold out threshold can be set to different values for different products, as well as different beverage dispensing unit applications.

Figure 10:
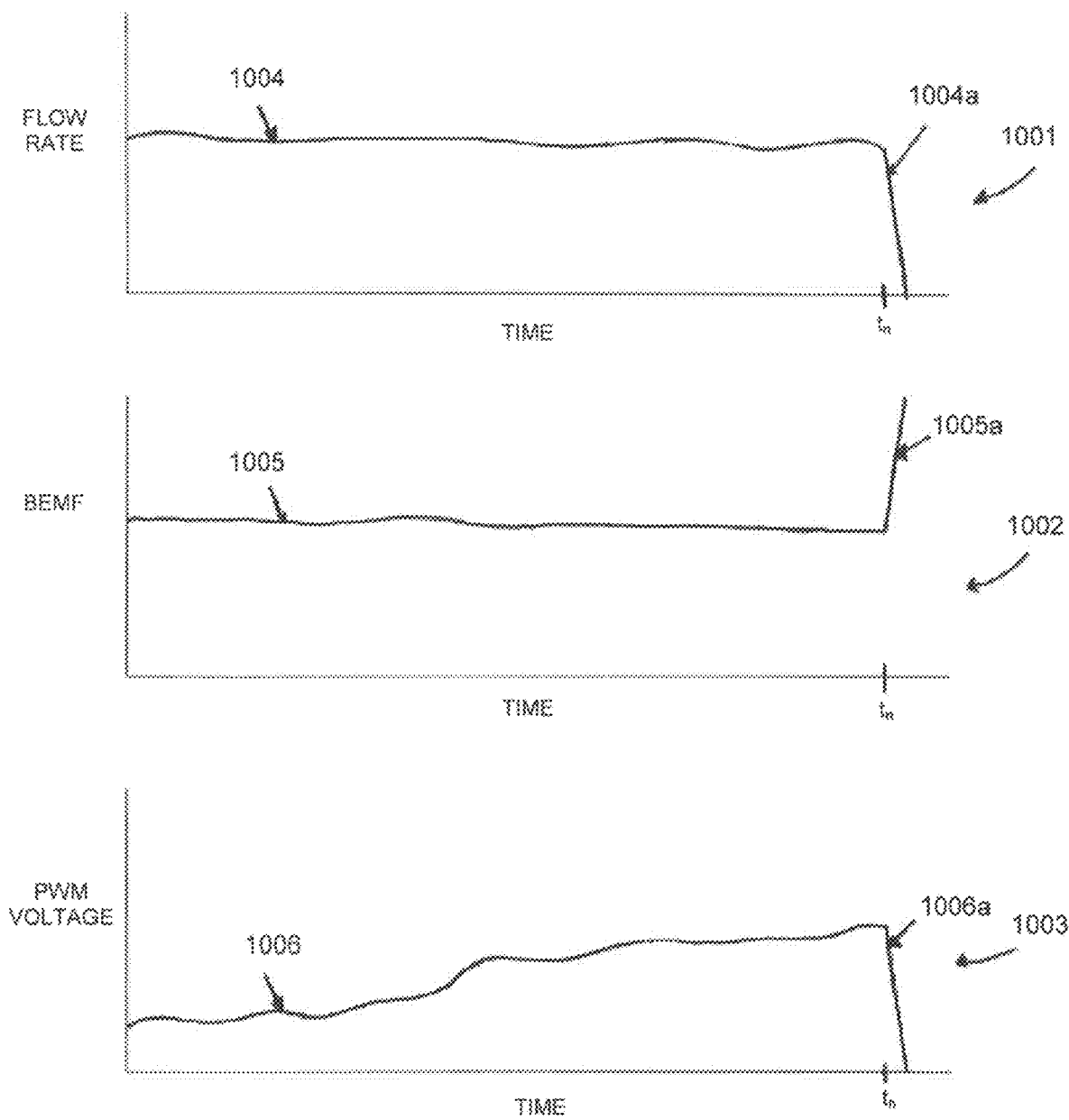
FIG. 10 is a graphic depiction of the relationship between of flow rate, BEMF, and PWM Voltage relationship that occurs over time while the system dispenses a fluid from a full BIB until the BIB is empty.

During normal operation, when the system is unblocked and there is sufficient fluid, the BEMF generated by the motor will remain consistent as fluid flow remains consistent. FIG. 10 depicts three representative graphs, flowrate graph 1001, BEMF graph 1002, and PWM Voltage graph 1003. The graphs show the relationship between the flowrate, motor BEMF, and PWM voltage applied to the motor over time as fluid is pumped. As shown, over time, the flowrate 1004 and motor BEMF 1005 remain relatively constant. However, the PWM voltage 1006 steadily increases. The increase is due to the operation described with relation to FIG. 8. The increase in PWM is necessary because the pump must work harder to achieve the same flowrate as the BIB bag becomes depleted. Eventually, at time $t_n$, an anomaly (such as a depleted bag) occurs. At that point, the flowrate drops precipitously due to air present in the tubing (1004a) resulting in a sharp rise in the motor BEMF (1005a). The BEMF rises sharply because there is very little fluid in the tubing, and so the pump and motor require significantly less energy to operate. The system recognizes the abrupt change, and the control system reacts by first decreasing the PWM voltage (1006a) in an attempt to compensate for the rise in BEMF. In differing embodiments, the detection may be based on a target value BEMF for indicating a sold out condition that may be a preset BEMF value, a total change in BEMF value, a percentage change in BEMF value or other BEMF value indicator.

In one embodiment, lowering the PWM does not produce the expected decrease in BEMF, leading the control system detects a sold out condition and reacts by suspending power to the pump. In one embodiment, the system may be calibrated such that it may detect a rise in BEMF, decrease the PWM applied in the next voltage pulse, detect a further rise in BEMF in the next consecutive sample, and decrease the PWM again in the next voltage pulse because the first decrease in PWM did not produce the expected decrease in BEMF over time. The system then samples the BEMF again and if the BEMF has risen further the system identifies that as an unexpected rise in BEMF over time and then immediately stops applying power to the motor. In an alternate embodiment, the system includes a threshold change in BEMF value, for example, a 20% change in BEMF. Upon sensing a 20% or greater change in BEMF, rather than adjusting the PWM voltage to try and bring the system back into the proper operating range, the system shuts off the power to the motor.

Figure 11:
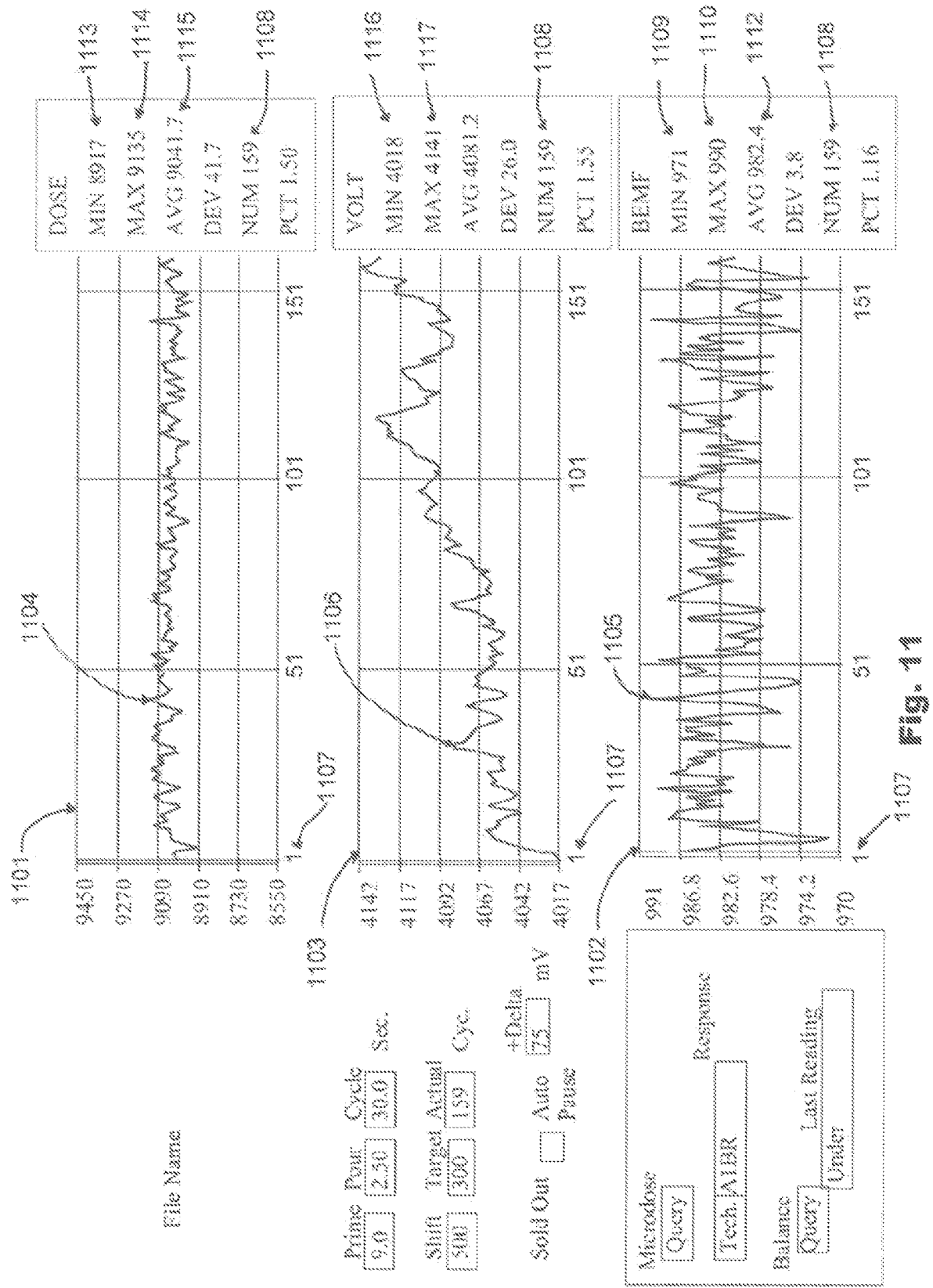
FIG. 11 is a graphic depiction of the operation of the fluid dispensing system showing the relationship between the fluid dispensed (dose) the applied voltage (volt) and the BEMF of the system (BEMF) over a number of dosing cycles.

FIG. 11 is a depiction of empirical measurements of the system during operation. It includes a flowrate graph 1101 showing flowrate 1104, a motor BEMF graph 1102 showing BEMF signal 1105, and a PWM graph 1103 showing PWM signal 1106. In the example shown, the system ran for 159 cycles (starting at cycle 1, 1107, and ending at cycle 159, 1108). Each data point has dispense duration ("Pour") of 2.50 seconds, and the each dispense was performed 30.0 seconds apart ("Cycle"). The BEMF signal 1105 received from the motor fluctuated between 971 mV (1109) to 990 mV (1110) during the 159 cycles. The target BEMF for the cycles was set at 980 mV, and the system was able to maintain an average BEMF of 982.4 mV (1112), only slightly off from the target value. The flowrate 1104 was held within a range of 8.917 grams (1113) and 9.135 grams (1114) thereby providing an average dose of 9.042 grams of product (1115) over the 159 cycles. During the same time, the PMW voltage 1106 escalated from approximately 4.02 volts (1116) to 4.14 volts (1117). Through controlling the PWM voltage as described above, the PWM voltage 1106 is slowly increased while the motor BEMF 1105 and flowrate 1104 are maintained relatively constant.

The control system may also utilize BEMF measurements to execute pump priming functions. Whenever the product supply is depleted on a beverage dispensing unit, some amount of air will enter the lines. The pump will need to be primed whenever a new product supply is connected to it in order to fill the lines and pump with product and bleed any air out from the lines. The prime function will power the pump, and the control system will monitor the BEMF during the prime function. Similar to the sold out condition, the air in the line will increase the pump RPM and in turn the BEMF measured by the control system until the line and pump fill with product. Once the line and pump have been filled, the pump RPM will return to normal operating range, the control system will measure BEMF within the target range, and the control system will end the prime function.

Additionally, the motor BEMF is used for detecting other abnormal conditions. For example, a condition can be programmed in the control system that the target BEMF should be reached within a set amount of time when initially priming the pump. For example, the target BEMF should be reached in 6 seconds. If the target BEMF is not reached within this time, it is indicative that the product container is not connected, or that there is a leak in the supply line. The control system will then alert the abnormal condition.

Another abnormal condition the control system uses motor BEMF to detect if a blocked line in either the discharge line or the suction line. If a blocked line condition is present, a dead headed pump condition will be present, in which flow through the pump will be inhibited. This blocked line condition will result in a significant drop in the BEMF measured by the control system. The control system will increase the PWM voltage in an attempt to increase the BEMF generated by the motor. Because the flow is physically blocked, a reciprocal increase in the BEMF will not be measured by the control system. One threshold condition to test for blockage is as follows: a BEMF threshold value is programmed into the control system memory, for example 300 mV; if the control system measures a BEMF 300 mV or less, the control system determines that a blocked condition is present. Another threshold condition to test for a blocked line is as follows: a PWM voltage threshold is programmed into the control system memory, for example 4 V; if the control system has increased the PWM voltage to 4 V without an increase in BEMF, the control system determines that a blocked line condition is present.

Furthermore, the control system uses BEMF measurements to detect if the motor has failed or is disconnected from the control system. If the control system measures no BEMF or a BEMF value lower than the expected magnitude of electrical noise, the control system determines that a failed motor condition is preset.

Additional System Features and Functions

In one embodiment of the system, the control system is programmed through a user interface connected to the control system I/O such as a keypad or touchscreen interface, or through an external device connected to the I/O such as a PC or laptop.

Several variables may be programmed into the control system memory. The target BEMF for the products is one variable. For example, one product may require a flowrate of 3.0 mL per second and have a corresponding target BEMF value of 750 mV. Another example is a different product requiring a flowrate of 3.3 mL per second and having a corresponding target BEMF of 850 mV. The BEMF values programmed into the control system are then called upon during the adjustment voltage calculations in order to maintain consistent pump flowrate.

Another set of variables that may be programmed into the control system are the BEMF values, time, and voltage values used for detecting sold out and abnormal conditions.

Figure 12A:
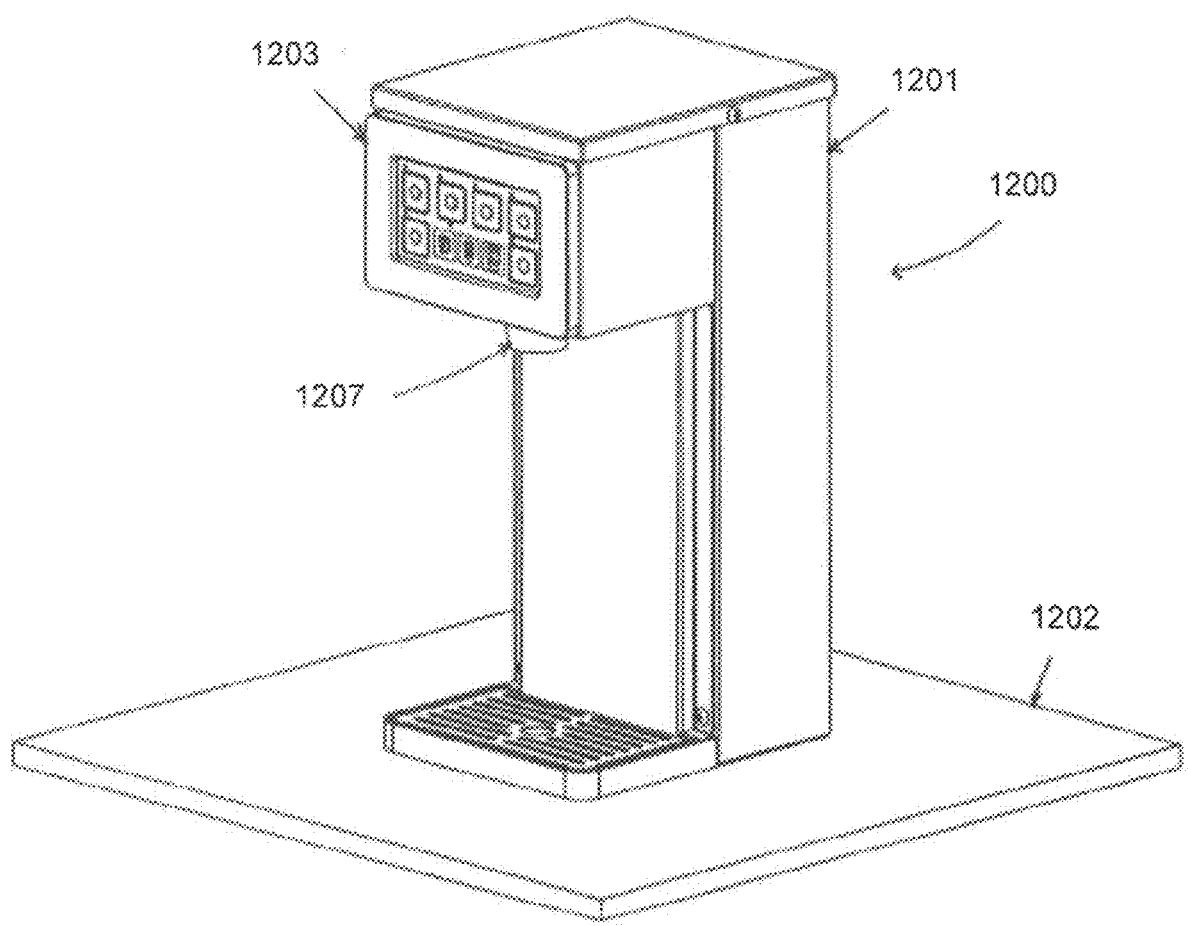
FIG. 12A is a depiction of an embodiment of a beverage dispensing unit.
Figure 12B:
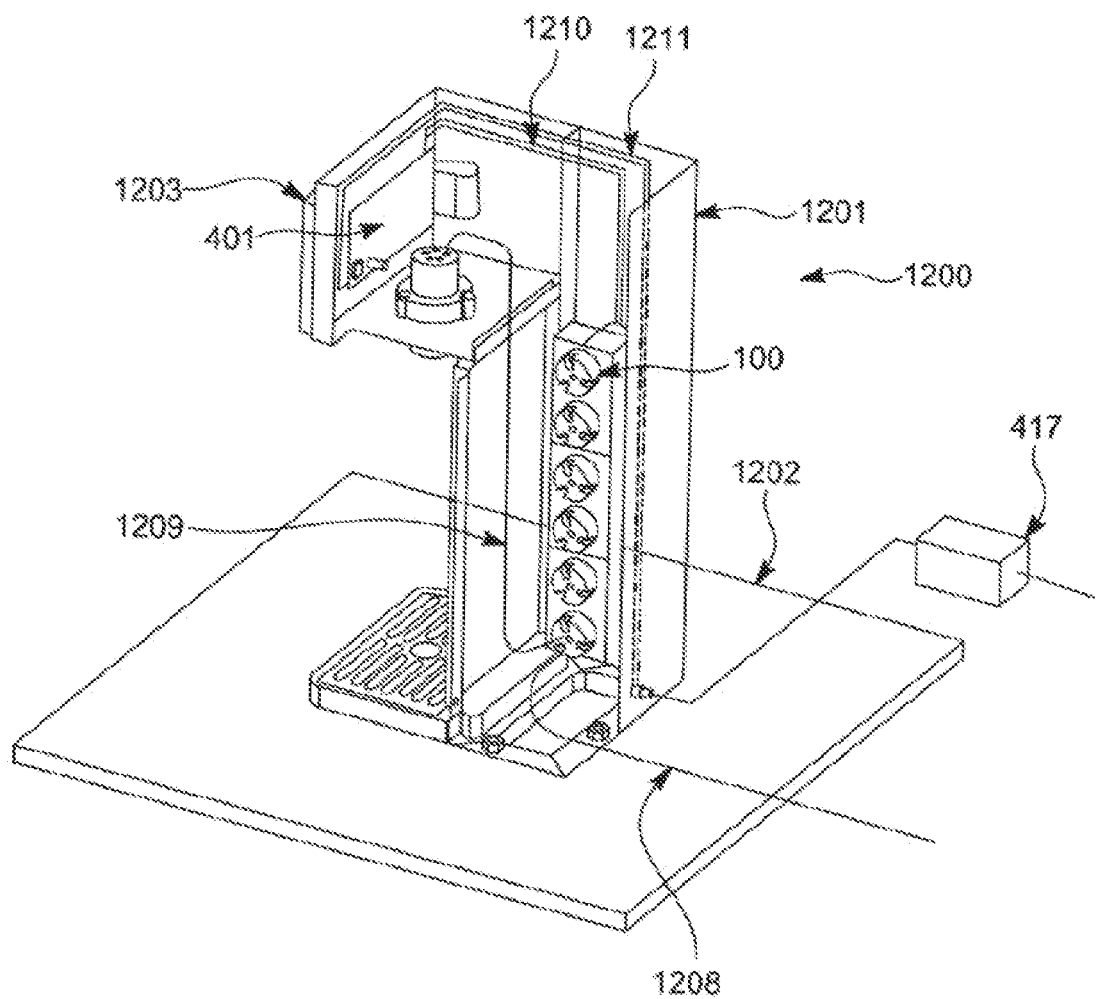
FIG. 12B is a depiction of an internal view of a beverage dispensing unit.
Figure 12C:
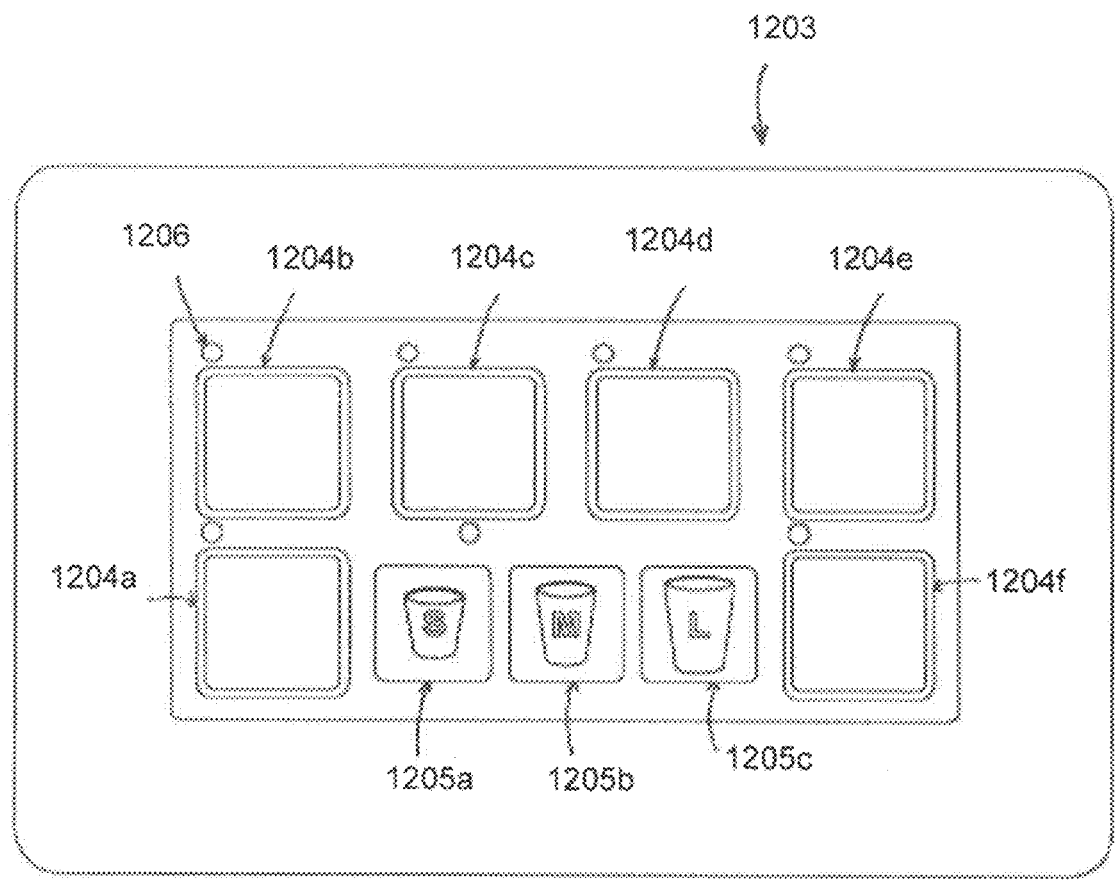
FIG. 12C is a depiction of a keypad of a beverage dispensing system.

With reference to FIGS. 12A, 12B, and 12C, the control system may be incorporated into a beverage dispenser 1200. The beverage dispenser 1200 includes a housing 1201 that may be mounted to a surface 1202. The dispenser includes a keypad 1203. In differing embodiments, the keypad may be a physical keypad with discrete buttons or may be a touchscreen display having discrete icon buttons or similar inputs. For explanatory purposes all such inputs may be generally referred to as keys. The keypad 1203 may include a plurality beverage selection keys 1204*a*, 1204*b*, 1204*c*, 1204*d*, 1204*e*, and 1204*f*, each corresponding to a different beverage, as well as beverage volume keys 1205*a*, 1205*b*, and 1205*c*. The keys may also be associated with one or more LEDs, such as LED 1206. The dispenser also includes at least one dispensing point, such as nozzle 1207 for dispensing beverages.

The housing may house a plurality of motor and pumps 100. Each pump may be connected to a product BIB (not shown) by a supply line 1208 and connected to the nozzle 1207 by output line 1209. It should be appreciated that all the pumps may include such lines, but that not all lines are shown in FIG. 12B for explanatory purposes. The housing may also house the controller 401 and a power supply 417 may be provided internally or externally. The motor and pumps 100 are electrically connected to the controller, for example, by wires 1210, and the controller is electrically connected to the power supply, for example, by wires 1211. The keypad 1203 is electrically connected to the controller as well, for example, by ribbon cable 1212.

The control system can be configured for either momentary dispensing or portion control dispensing modes. When configured for momentary dispensing, the control system powers the motor to dispense product for as long as a dispense command is received by the control system; once the dispense command is stopped, the control system removes power from the motor. For example, a user may depress key 1204*a* for a period of time thereby causing the controller to dispense the corresponding beverage for that time.

One method of portion control dispensing is accomplished using a time based dispense. One of several dispense sizes is specified during the dispense command; the dispense size specified is a time value. For example, a user may press volume key 1205*a* for a small beverage and then select the particular type of beverage by pressing key 1204*b* (or vice versa). Pressing the second selection initiates a dispense command, and the control system powers the motor and continues to supply power to the motor for the duration of a preset time value associated with the selected volume.

Another method of portion control dispensing is achieved by dispensing a total volume (or mass) of product. The keys are configured to allow the operator to specify an arbitrary total amount of product. One configuration of the keypad includes an increase amount key, such as an up arrow icon, and a decrease amount key, such as a down arrow icon, and the present amount to be dispensed is shown on a display. Another configuration of the keypad includes numerical keys so that the desired amount may be entered as a numerical value directly by the operator, and the entered amount is shown on a display. The value for the flowrate and BEMF relationship is preprogrammed into the control system for each product. The control system calculates the time required to dispense the operator entered amount of product. An example calculation the control system executes is Time=Amount/FR1, where FR1 represents the value for the flowrate and BEMF relationship (in volume per second).

One method of programming the control system variables is through the use of a keypad connected to the control system I/O. For example, a single key on the keypad is pressed and held for a duration longer than normal operation would call for, such as pressing a product flavor selection key for 3 seconds, or two keys pressed simultaneously, such as two different flavor keys for 3 seconds, which would put the control system into a mode that accepts programming inputs. While in the programming mode, an LED connected to the I/O illuminates indicating that the control system is in programming mode. Momentarily pressing a product flavor key activates the respective product in the control system and flags it for programming. Holding the portion size dispense key on the keypad for a desired duration sets the dispense time variable for the active product. Then, holding the active product key down while repeatedly momentarily pressing a second, inactive flavor key, increases the target BEMF value; repeatedly momentarily pressing an inactive, third product flavor key decreases the target BEMF. In an alternate embodiment, a display is also included on the housing to allow the programmer to view the changes made to the control system.

The control system can save sold out and abnormal operation detection events, as well as operational data such as total product dispensed, the number of BIB changes and prime commands issued, and similar dispensing related data, in its internal memory. This information may then be communicated through its I/O connections to alert and inform the operator of the beverage dispensing equipment. One example is the control system alerting the operator when a product supply BIB is sold out by illuminating an LED connected to the control system I/O or beverage dispensing unit's structure. Another example is posting a text string notification, such as that a BIB is decoupled or that there is a leak in the suction line, to a display, such as an LCD, connected to the control system I/O. The information stored in the control system internal memory can also be polled through the I/O by a restaurant manager, for example, to determine consumption rate of a particular product for planning how much of the product needs to be reordered. The information can further be routed to a server and accessed over an intranet or the internet. The data may be accessed or forwarded to account managers so that a facility's product requirements may be manually or automatically updated.

It should be appreciated that the system could be used to simultaneously dispense product from multiple locations, such as multiple BIB containers. For example, one of the keys may be programmed to dispense a half-lemonade, half-iced-tea beverage. Pressing the key sends signals through the control system to the motor associated with a lemonade BIB and to the motor associated with the iced tea BIB. Fluid is dispensed from each simultaneously in the same manner as described above with respect to dispensing fluid from a single source. The fluid is pumped from each BIB and out through a nozzle and thereby mixed together to form the beverage. Because the system works by ensuring control over the flow of the fluid based on specific characteristics of the fluid and the precise operation of the motor, accurate volumes of fluid are achieved to ensure the correct flavor profile of the mixed drink.

In one embodiment, a dispensing button is programmed to dispense fluid from multiple different sources simultaneously and on-demand. A user presses the button and, so long as the button is selected, the system dispenses fluid. To accurately dispense the proper ratio of fluid from multiple sources, the system is programed with a reduced power requirement that is less than would be needed for a full strength dispense of the same fluid. For example, for a half-lemonade, half-iced tea drink, the lemonade is programed to dispense at 40% of the power requirement that would be used by the system if a lemonade only drink had been selected, and the iced tea is programmed to dispense at 55% of the power requirement that would have been used by the system if an iced tea only drink had been selected. Additionally, appropriate target BEMF values for the fluids are programed for reference by the control system. Selecting the half-and-half button causes the system to pump the appropriate fluids simultaneously, using the lower power requirements and alternate BEMF target values to maintain proper control over the flow of each fluid throughout the course of the dispensing. This allows the system to dispense preselected ratios of different fluids (some of which may have different viscosities) and dispense each continuously and simultaneously. It also maintains accuracy of flow control without the need to physically restrict the fluid flow through the use of additional mechanical valve and allows the system to dispense fluids at different rates from the same source location on-the-fly also without the use of additional mechanical valves.

Figure 13:
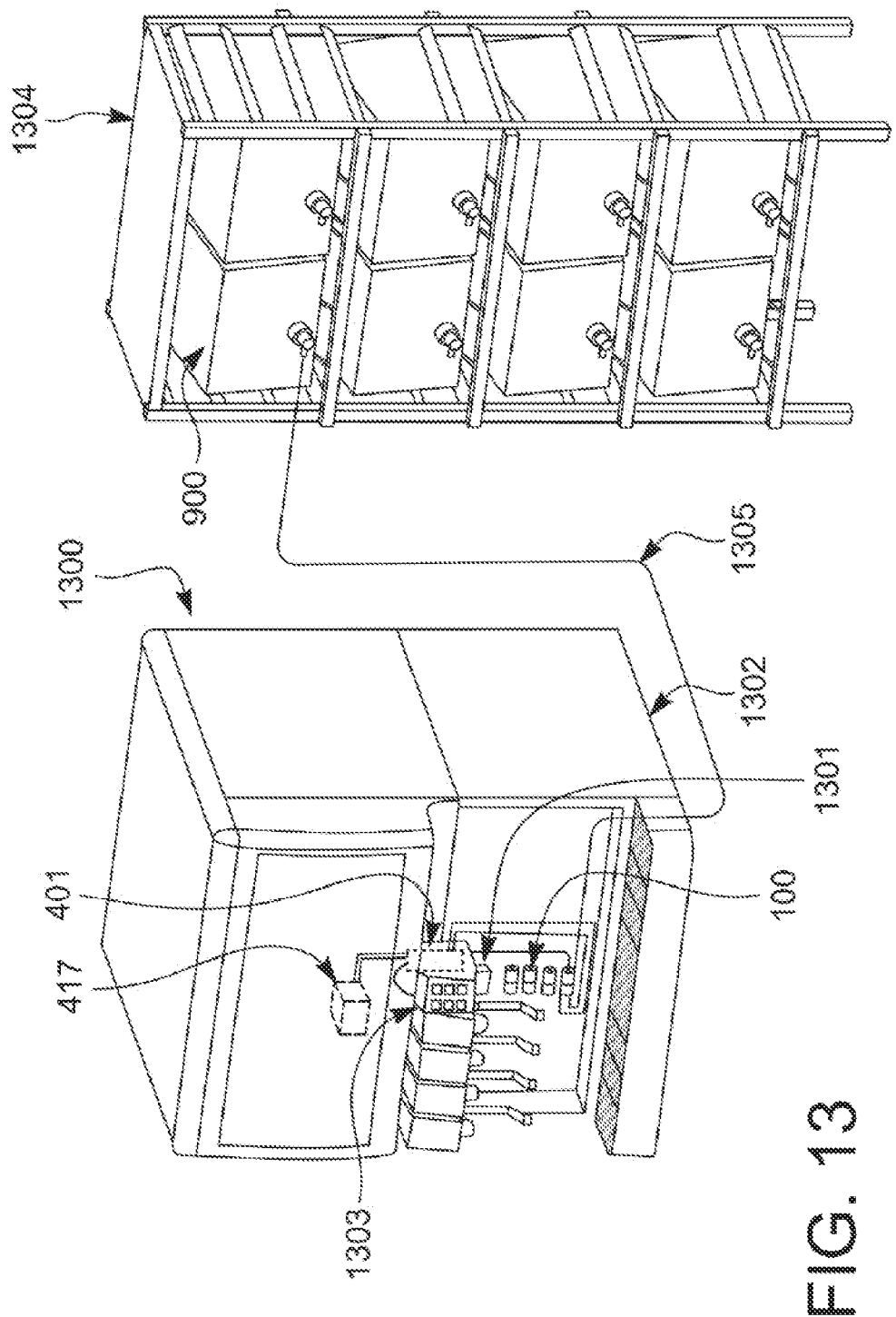
FIG. 13 is a depiction of an alternate embodiment of a beverage dispensing system including a beverage dispensing unit and rack of associated BIB containers.
Figure 14A:
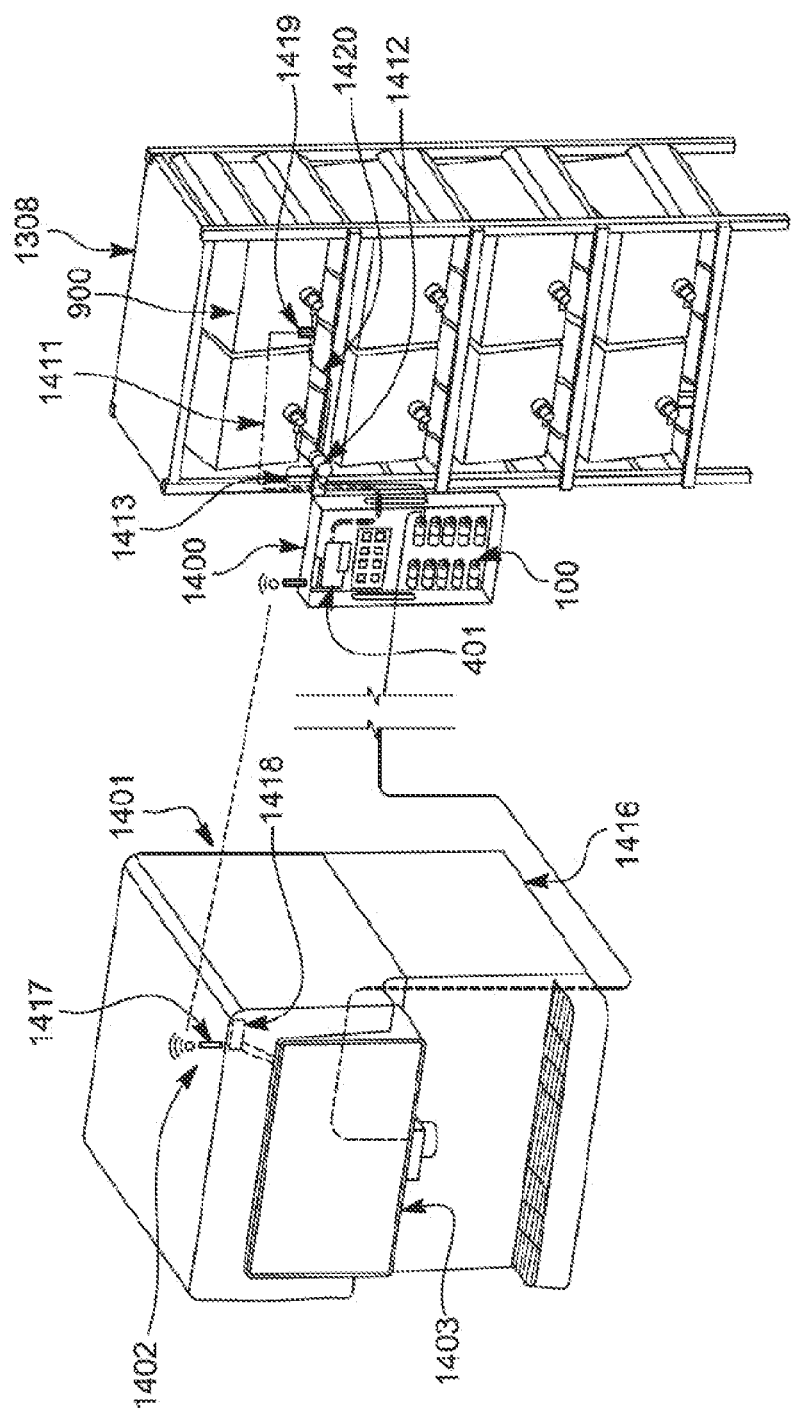
FIG. 14A is a depiction of an alternate embodiment of a beverage dispensing system including a beverage dispensing unit and rack of associated BIB containers.

FIGS. 13 and 14A are examples of alternate embodiments. The embodiment of FIG. 13 is a modified version of a traditional beverage dispenser 1300. It includes a plurality of motor and pump systems 100 which are connected to an output nozzle 1301 surrounded by a housing 1302. Keys 1303 are provided on the outside of the housing and are connected to a controller 401 within the housing. The motor and pump systems are connected to a rack 1304 of BIB packages 900 containing products. One such connection, tube 1305, is shown for exemplary purposes. In that embodiment, the power supply 417 is located within the beverage dispenser 1300.

FIG. 14A is an embodiment where the control system I/O is compatible with and can be connected to wireless data transceivers, such as a wireless Ethernet adapter. It will be understood by those of skill in the art that other wireless transmission protocols, such Bluetooth, RF, infrared, or other system could be utilized. The wireless connection allows the control system to communicate and operate with devices and equipment that are not physically wired to it. One such application of the wireless functionality is the control system 1400 located remotely from the dispensing unit 1401 with wireless transceivers. The controller 401 and a plurality of motors and pumps 100 are placed at the product supply rack 1304, or BIB rack, which is typically located a substantial distance away from the beverage dispensing unit 1401, for example at a distance of 100 feet away. For optimal fluid flow performance, it is preferable that the pump fluid inlet be located as close as possible to the BIB rack. In this embodiment, the beverage dispensing unit 1401 also has a transmitting and receiving device 1402 wirelessly coupled to the control system 1400. Dispense and programming commands may be communicated wirelessly from the beverage dispensing unit to the control system. Data, sold out notification and abnormal operation alerts may be wirelessly sent from the control system to the beverage dispensing unit.

Figure 14B:
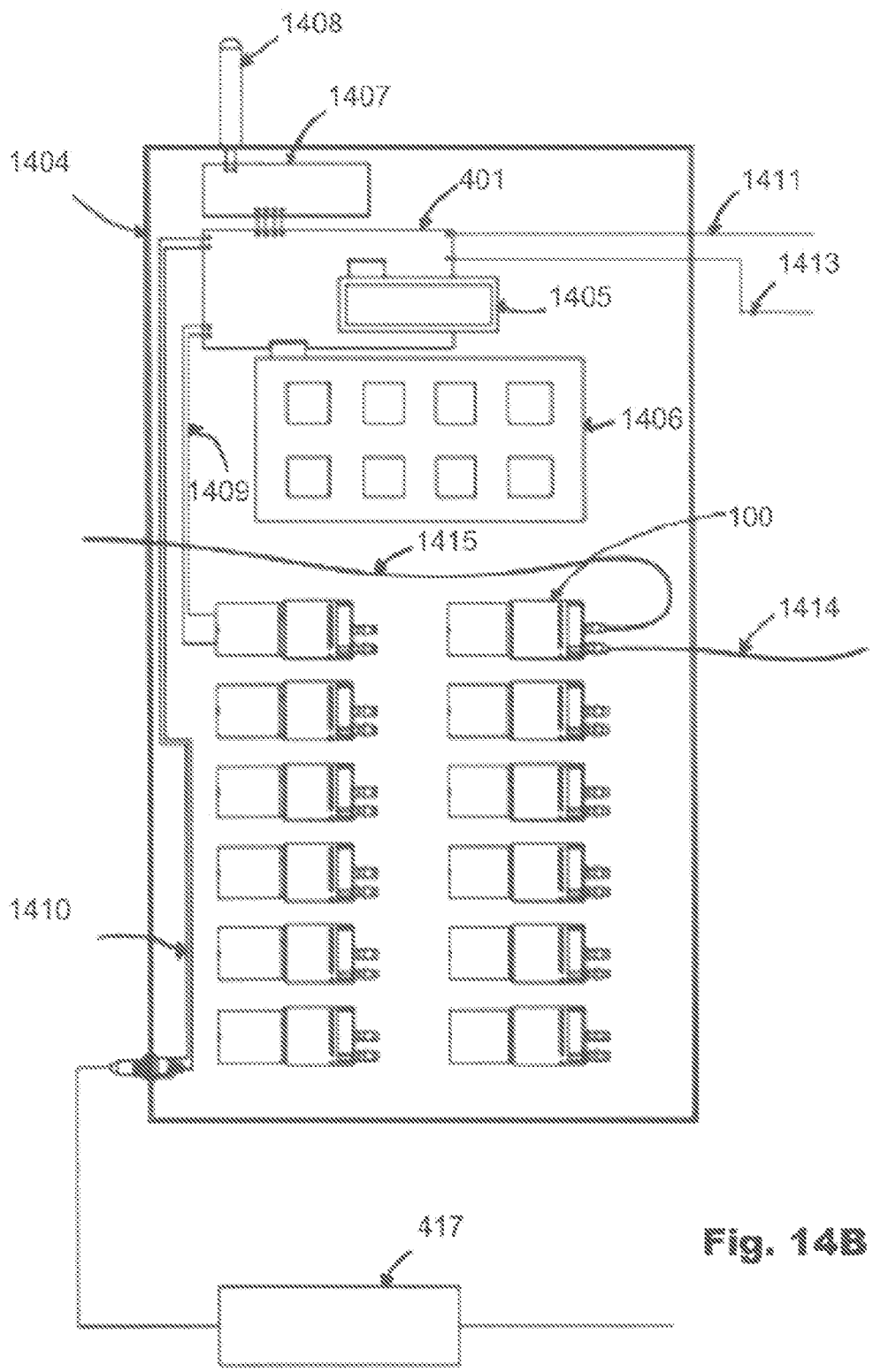
FIG. 14B is a depiction of a control system and pump array for operating an embodiment of a beverage dispensing system.

In FIG. 14A, a touchscreen display 1403 is used for an operator interface. The display 1403 can display a number of icons (not shown) that can be selected in the same manner as traditional keys. Also in the embodiment of FIG. 14A, the controller and motor and pump systems, shown in greater detail in FIG. 14B, are located remotely and operated wirelessly. In that embodiment, the controller 401 and a plurality of motor and pump assemblies 100 are mounted within housing 1404. The controller 401 includes a display 1405 and keypad 1406. A transceiver 1407 and antenna 1408 can be connected to the controller or integrated with the controller. The motor and pump assemblies are each connected to the controller, for example, by wires 1409. The controller is powered through an electrical connection 1410 and power supply 417. Sensor data can be input into the controller through additional connections, such as wire 1411, and the controller can be electrically connected to additional components, such as one or more valves 1412, through for example, wire 1413. Each pump includes an inlet tube 1414 for receiving product and an outlet tube 1415 for sending product to an outlet.

The beverage dispenser 1401 has a housing 1416 that includes an antenna 1417 and transceiver 1418 for sending and receiving signals. A rack 1304 holds BIB containers 900 that are connected to the assemblies of motors and pumps 100. In this embodiment, multiple BIB containers may be connected to a single pump thorough a solenoid valve 1412. Where the BEMF measurement taken by the control system indicates a sold out condition of the one BIB container, the control system reacts by activating the solenoid valve to switch to another BIB container coupled to the solenoid valve. A sensor 1419, such as a temperature sensor, may be placed in-line with the supply line 1420 and connected electrically, such as by wire 1411, to the controller 401.

The control system I/O may be configured to accept one or more temperature sensor inputs, such as a thermocouple or thermistor. In one embodiment, the control system memory is programmable to store temperature offset values for the target BEMF voltage values for several products. Several product target BEMF values are programmable to accept temperature compensated value adjustments. Through the temperature offset values, the control system maintains consistent flow rate as product temperature varies. The temperature sensors are in physical contact with the product within the line and are located at the pump inlet, or at the product storage container, or at both the pump inlet and storage container, and the temperature sensors may be located at several additional positions along the line between the pump inlet and product container.

The viscosities of some products are highly sensitive to temperature; as the temperature decreases, the viscosity of the product significantly increases, and vice versa. This is typical for products containing a large concentration of sugar. A significant increase in viscosity of the product changes the volumetric relation between pump RPM and flow rate, and it thereby changes the relation between motor BEMF and flow rate. A diaphragm pump, as an example, uses bellows-like chambers constructed from a flexible material that expand and compress fluid as the fluid is pumped. There is also a small amount of internal flow bypass within the pump resulting in some fluid to enter the pump, and rather than being forced to flow out of the pump, the bypass flow circulates internally within the pump. A significant increase in the viscosity of the fluid causes less fluid to be drawn into the chambers for a particular pump RPM due to the flexible property of the chamber material, and it cause a larger amount of the fluid to contribute to the bypass flow.

The effects due to significant viscosity increase are predictable and can be accounted for by the control system adding a temperature compensated offset values to the target BEMF. When a target BEMF value is programmed to accept temperature compensated adjustments, the control system measures the temperature of the product and calculates an adjusted target BEMF using the measured BEMF, the product temperature measured through one or more temperature sensor inputs, and one of several temperature offset values programmed into memory.

An example temperature compensated target BEMF value (tempAdjust_BEMF_target) is as follows:

tempAdjust=tempOffset×(20−tempMeasured)

tempAdjust_BEMF_target=BEMF_target+tempAdjust

Figure 7:
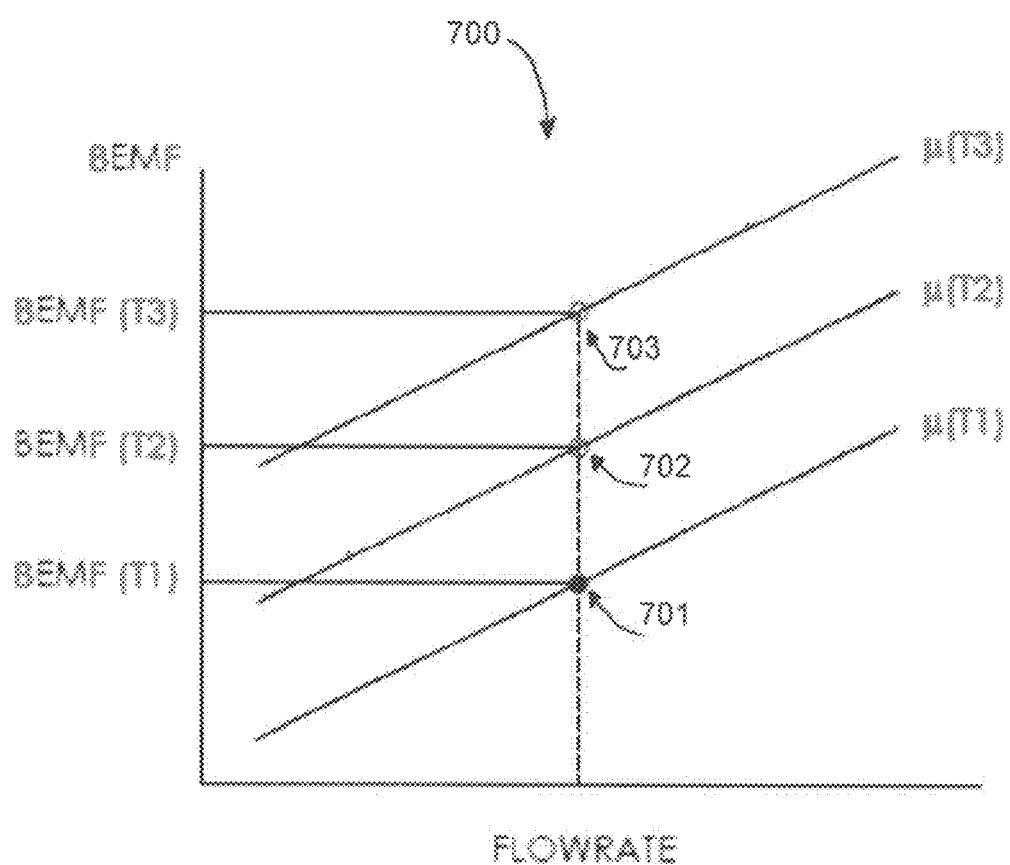
FIG. 7 is an exemplary graph depicting the difference in BEMF at differing temperatures that correspond to the same flow rate.

In the presented example, 20 represents 20 degrees Celsius as the nominal operating temperature, and an example temperature offset value may be 5 mV per degree Celsius, in which the target BEMF is adjusted 5 mV for every degree Celsius change in measured product temperature. FIG. 7 is a graph 700 depicting the relationship between flowrate, BEMF, and temperature. The system may include programed BEMFs for temperature 1 (T1), temperature 2, (T2) and temperature 3 (T3), where T1>T2>T3. These are shown as BEMF (T1), BEMF (T2), and BEMF (T3). In the example shown, the motor must work harder to pump colder product, resulting in higher BEMF. The flowrate may be held constant by the control system by sensing the varying temperature and selecting a BEMF offset 701, when the temperature is at T1, 702 when the temperature is at T2, and 703 when the temperature is at T3 and thereby automatically maintains consistent flow even when the temperature varies.

In another embodiment, one or more temperature sensors are placed on the motor housing, and the control system measures the motor temperature. The control system memory is programmable to store temperature compensated offset values for the target BEMF based on the motor temperature. It should be understood by those of skill in the art that BEMF generated by a motor is dependent on the magnetic flux density produced by the motor's magnet, and that a rise in the temperature of the magnet results in reversible demagnetization. A rise in the motor temperature will therefore result in a lowering of the BEMF generated. In addition, as the temperature of the motor increases, its torque characteristics and electrical response to voltage are also affected. Generally, many dispensing systems will not require compensation for motor temperature in order to maintain the flowrate precision for the particular application. However, dispensing systems performing high frequency dispensing (for example 5 or more dispenses per minute) can cause the motor temperature to rise sufficiently enough to impact the flow rate precision. Similarly, high precision, low flow rate dispensing systems (such as 1.0 mL per second or less) may be significantly affected by the motor temperature. The present system monitors the motor temperature, and as the motor temperature increases, the temperature offset values are subtracted from the target BEMF by the control system. That is, the control system adjusts the PWM voltage until it measures the target BEMF minus the additional offset value as a function of motor temperature. As the temperature of the motor decreases, the control system reduces the offset value compensation to the target BEMF. The temperature offset values are based on the magnetic materials and construction of the motor, information which is commonly available from the motor manufacturer or may be calculated using empirical data. The offset values may then be preprogramed into the system for the corresponding motors.

Although the present invention has been described in terms of the preferred embodiments, it is to be understood that such disclosure is not intended to be limiting. For example, although embodiments were described with respect to BIB applications, it should be understood that the present system may be used in a variety of alternative fluid dispensing applications. Various alterations and modifications will be readily apparent to those of skill in the art. Accordingly, it is intended that the appended claims be interpreted as covering all alterations and modifications as fall within the spirit and scope of the invention.

What is claimed is:

1. A method of controlling the outflow of a computer controlled motor and pump system comprising:
    step 1) a computer controller receiving a signal corresponding to a dispense command;
    step 2) applying base voltage pulses to a motor of a motor and pump system to drive the motor at a first average voltage, wherein each pulse is comprised of a period of time when voltage is applied followed by a period of time where voltage is not applied;
    step 3) measuring a plurality of instantaneous back electromotive force values of the motor over the course of a plurality of pulses, wherein the measurements of each of the plurality of instantaneous back electromotive force values are taken during the period of time of step 2 where voltage is not applied;
    step 4) averaging the plurality of instantaneous back electromotive force values to obtain an average back electromotive force value;
    step 5) storing the average back electromotive force value in a memory accessible by the controller;

step 6) calculating an adjustment voltage based on the first average voltage, a target back electromotive force, and the average back electromotive force;

step 7) adding the adjustment voltage to the first average voltage to obtain a new run voltage;

step 8) adjusting the pulse width of the base voltage pulses to drive the motor at the new run voltage.

2. The method of controlling the outflow of a computer controlled motor and pump system of claim 1, wherein the first average voltage is calculated by averaging the voltage applied over a plurality of pulses, and wherein the new run voltage is calculated by averaging the voltage applied over a plurality of pulses.

3. The method of controlling the outflow of a computer controlled motor and pump system of claim 1 further comprising:

stopping the receiving of a signal corresponding to a dispense command;

stopping the motor;

receiving a new signal corresponding to a dispense command;

repeating steps 2 through 8 wherein the first average voltage of repeated step 2 is the new run voltage, and wherein the new run voltage of repeated steps 7 and 8 is a second new run voltage.

4. The method of controlling the outflow of a computer controlled motor and pump system of claim 1 further comprising:

step 9) stopping the receiving of a signal corresponding to a dispense command;

step 10) stopping the motor;

step 11) repeating steps 1 through 10 for a plurality of cycles, wherein one cycle comprises conducting steps 1 through 10 once each and wherein, for each successive cycle, the value of the first average voltage of step 2 is the value of the new run voltage determined during step 7 of the previous cycle.

5. The method of controlling the outflow of a computer controlled motor and pump system of claim 4, wherein over the course of a plurality of successive cycles, the average of a plurality of successively applied first average voltage values of step 2 diverges from the first average voltage applied during the first cycle of the plurality of cycles.

6. The method of controlling the outflow of a computer controlled motor and pump system of claim 4 wherein, over the plurality of successive cycles, the average back electromotive force value of step 4 remains convergent on the target back electromotive force.

7. The method of controlling the outflow of a computer controlled motor and pump system of claim 4, wherein, when, over the plurality of successive cycles the average back electromotive force value of step 4 diverges from the target back electromotive force for three consecutive cycles, the controller stops applying the base voltage and indicates an abnormal condition.

8. The method of controlling the outflow of a computer controlled motor and pump system of claim 4 wherein the base voltage remains constant over the plurality of cycles.

9. The method of controlling the outflow of a computer controlled motor and pump system of claim 1, wherein the measurements of the instantaneous back electromotive force values in step 3 are taken at the midpoint of.

10. The method of controlling the outflow of a computer controlled motor and pump system of claim 3, wherein the first average voltage of repeated step 2 is different from the new run voltage of repeated steps 7 and 8.

11. The method of controlling the outflow of a computer controlled motor and pump system of claim 3, wherein the voltage adjustment of step 6 is calculated by dividing the target back electromotive force by a figure derived from the average back electromotive force and multiplying the result by the first average voltage to calculate a theoretical voltage, then subtracting the first average voltage from the theoretical voltage, and then multiplying the result by a percentage.

12. The method of controlling the outflow of a computer controlled motor and pump system of claim 3, wherein the percentage is 33%.

* * * * *